US008472115B2

(12) United States Patent
Suzuki et al.

(10) Patent No.: US 8,472,115 B2
(45) Date of Patent: Jun. 25, 2013

(54) ANISTROPIC DYE LAYER, COORDINATION POLYMER FOR ANISTROPIC DYE LAYER AND POLARIZATION ELEMENT, AND POLARIZATION CONTROL FILM, POLARIZATION CONTROL ELEMENT, MULTI-LAYER POLARIZATION CONTROL ELEMENT, ELLIPSE POLARIZATION PLATE, LIGHT EMISSION ELEMENT, AND METHOD FOR CONTROLLING POLARIZATION PROPERTIES EMPLOYING THE ANISTROPIC DYE LAYER

(75) Inventors: Takatugu Suzuki, Tokyo (JP); Yukihito Nakazawa, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 653 days.

(21) Appl. No.: 12/630,142

(22) Filed: Dec. 3, 2009

(65) Prior Publication Data

US 2010/0142050 A1  Jun. 10, 2010

(30) Foreign Application Priority Data

Dec. 8, 2008 (JP) ................................. 2008-311890
May 26, 2009 (JP) ................................. 2009-126250
Aug. 3, 2009 (JP) ................................. 2009-180458

(51) Int. Cl.
*G02B 5/30* (2006.01)
*C08G 73/06* (2006.01)
*C08G 79/00* (2006.01)

(52) U.S. Cl.
USPC ....................... 359/487.02; 528/395; 528/423

(58) Field of Classification Search
USPC ................. 359/487.02, 489.06; 528/395, 423
See application file for complete search history.

(56) References Cited

U.S. PATENT DOCUMENTS

2009/0062409 A1* 3/2009 Matzger et al. ................ 521/50
2009/0242856 A1* 10/2009 Leznoff et al. ................ 252/582

FOREIGN PATENT DOCUMENTS

| JP | 57189138 A | * 11/1982 |
|---|---|---|
| JP | 03012606 | 1/1991 |
| JP | 2005538878 | 12/2005 |
| JP | 2007025465 | 2/2007 |
| JP | 2007-112957 | 5/2007 |
| JP | 2007112769 | 5/2007 |
| JP | 2007112957 | 5/2007 |
| JP | 2008122485 | 5/2008 |
| WO | 02099480 | 12/2002 |
| WO | 2005035667 | 4/2005 |

OTHER PUBLICATIONS

Peter Andersson et al., "Switchable optical polarizer based on electrochromism in stretch-aligned polyaniline", Applied Physics Letters, vol. 83, No. 7, pp. 1307-1309, Aug. 18, 2003.*
Japanese Office Action of priority document JP 2009-180,458 issued by the JPO and an English language translation thereof.*
Japanese Office Action, Application No. P2009-260766, date: Mar. 15, 2013.
English translation of Japanese Office Action, Application No. P2009-260766, date: Mar. 15, 2013.

* cited by examiner

*Primary Examiner* — Frank Font
(74) *Attorney, Agent, or Firm* — Lucas & Mercanti, LLP

(57) ABSTRACT

An anisotropic dye layer containing a coordination polymer is disclosed. The a polarization control film containing an oriented dichroic dye in which light absorption spectrum of a molecule is reversibly changed by charge passing are disclosed.

5 Claims, 8 Drawing Sheets

FIG. 7.1
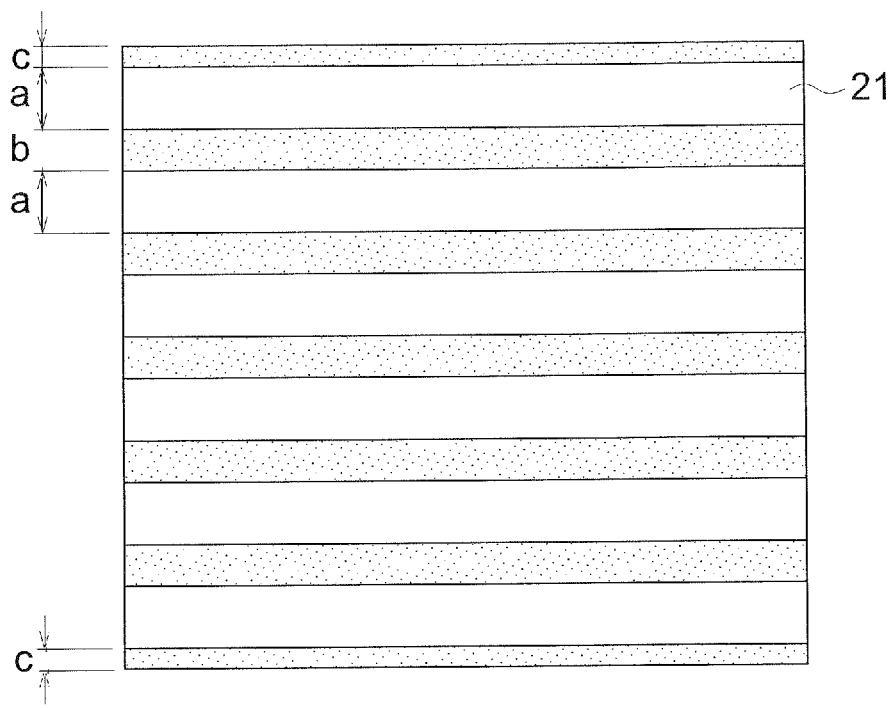
FIG. 7.2
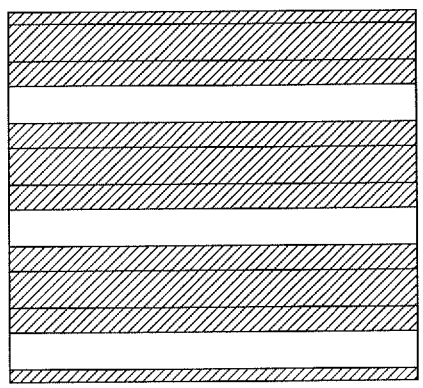
FIG. 7.3
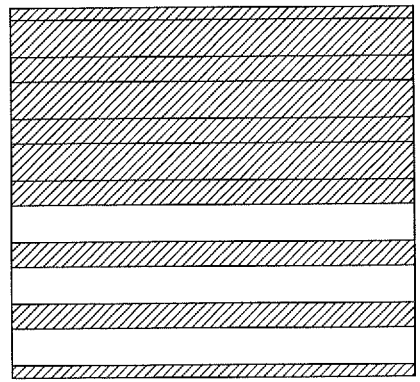

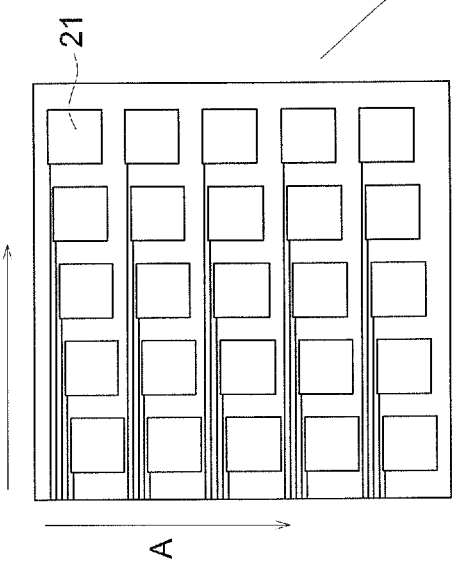
FIG. 8.1
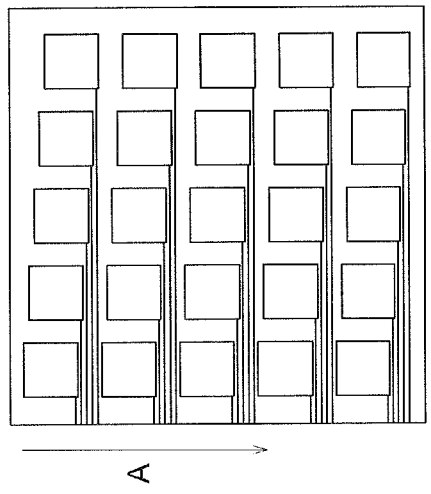
FIG. 8.2
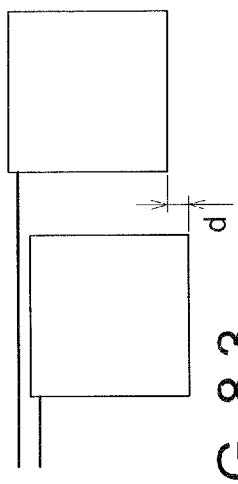
FIG. 8.4
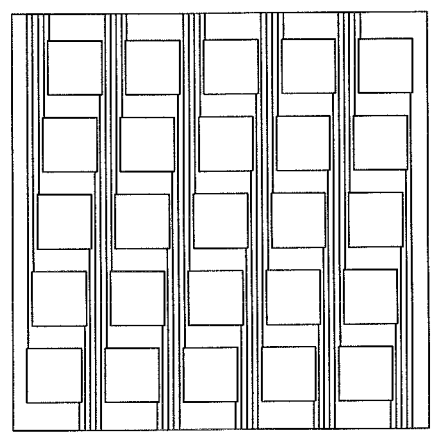
FIG. 8.3
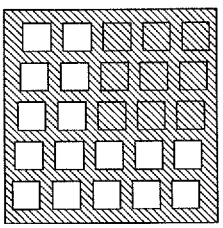
FIG. 8.7
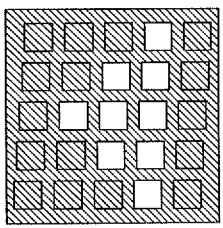
FIG. 8.6
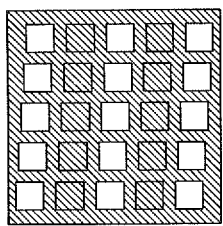
FIG. 8.5

FIG. 9.1    FIG. 9.2    FIG. 9.3
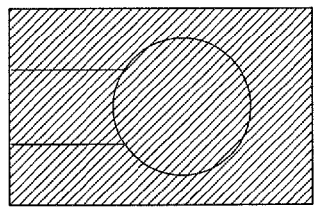 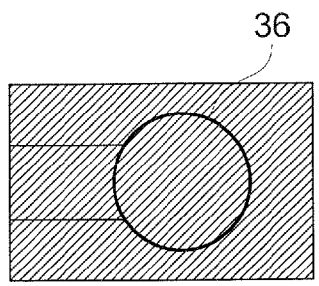  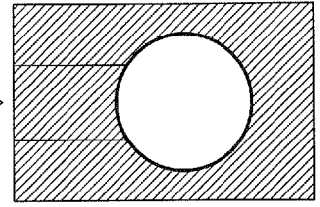
36

ANISTROPIC DYE LAYER, COORDINATION POLYMER FOR ANISTROPIC DYE LAYER AND POLARIZATION ELEMENT, AND POLARIZATION CONTROL FILM, POLARIZATION CONTROL ELEMENT, MULTI-LAYER POLARIZATION CONTROL ELEMENT, ELLIPSE POLARIZATION PLATE, LIGHT EMISSION ELEMENT, AND METHOD FOR CONTROLLING POLARIZATION PROPERTIES EMPLOYING THE ANISTROPIC DYE LAYER

This application is based on Japanese Patent Applications No. 2008-311890 filed on Dec. 8, 2008, No. 2009-126250 filed on May 26, 2009, and No. 2009-180458 filed on Aug. 3, 2009, in Japanese Patent Office, the entire content of which is hereby incorporated by reference.

FIELD OF THE INVENTION

The present invention relates to an anisotropic dye layer, a coordination polymer for the anisotropic dye layer and a polarization element, and, in detail, to an anisotropic dye layer containing a coordination polymer and a polarization element.

The present invention further relates to a polarization control film, a polarization control element, a multi-layer polarization control element, an ellipse polarization plate, a light emission element, and a method for controlling polarization, which are usable for a display device, a lighting device, polarization eyeglasses, a privacy film, and the like.

BACKGROUND

In liquid crystal displays, a linear polarization plate or a circular polarization plate is used for controlling the optical rotary strength or the double refraction property in the display. The circular polarization plate is also used in organic electroluminescence displays for preventing reflection of external light.

Hitherto, an anisotropic dye layer is widely used, which is obtained by dissolving or adsorbing iodine or a dichroic dye to a polymer material such as poly(vinyl alcohol) and stretching the obtained layer in a certain direction in a form of film to orient the dichroic dye; cf. Patent Document 1.

In usual anisotropic dye layer thus prepared, however, some problems are posed such as that the heat resistance or light resistance is insufficient or the yield rate of pasting the anisotropic dye layer in production course of the liquid crystal apparatus is low depending on the kind of dye or polymer material.

Therefore, a method is investigated, in which, the anisotropic dye layer is formed by that a coating liquid containing the anisotropic dye is coated on the substrate such as glass or transparent film by the wet layer forming method, and the dichroic dye is oriented by utilizing the interaction between the molecules of the dye; cf. Patent Document 2, for example.

In the use as the polarization element, the anisotropic dye layer having high dichroic property is required for obtaining higher polarization ability. However, these usual anisotropic layers are inferior in the dichroic property. Therefore, the polarization element having superior polarization property cannot be obtained.

Hitherto, various dyes are used in the anisotropic dye layer and the selection of dye is one of important factors. For instance, it is described in Patent Document 1 that the dichroic dye represented by the following structural formula.

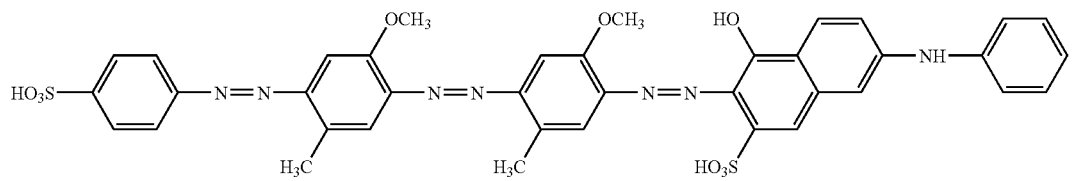 [SMILES: COc1cc(N=Nc2ccc(S(=O)(=O)O)cc2)c(C)cc1N=Nc1cc(OC)c(N=Nc2c(S(=O)(=O)O)cc3cc(Nc4ccccc4)ccc3c2O)cc1C]

However, the compound described in Patent document 1 cannot be considered as sufficient for the material of the anisotropic dye layer formed by the wet layer forming method because the compound is insufficient in the dichroic property and low in the solubility in various solvents.

The anisotropic dye layer produced by the wet layer forming method is described in Patent Document 2, and the compound represented by the following structural formula are described as an example of usable dichroic dye.

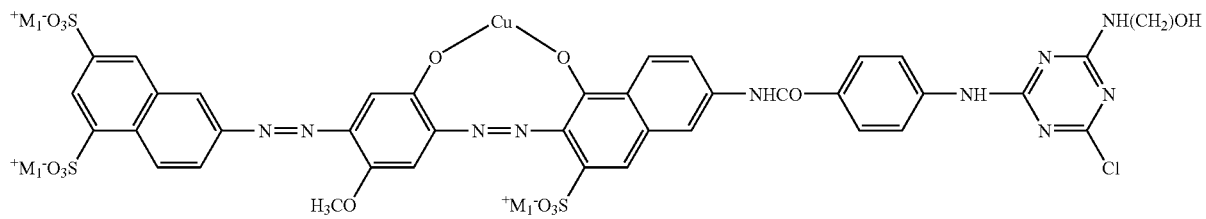

However, the above compound causes a problem that the compound is easily decomposed since the compound is a dis-azo compound and a halogen atom is bonded with the triazine ring.

Moreover, patent Document 3 describes that the anisotropic dye layer having high anisotropy can be obtained by the use of a dichroic azo dye having a specific structure in which a triazinyl group and three or more azo bonds are included in the molecule thereof.

However, the dichroic ratio of the anisotropic dye layer obtained by such technology is insufficient even though the ratio is increased by the technology, and a technology capable of increasing the dichroic ratio is further demanded.

A layer having deep color is preferable for the polarization layer and the color is necessarily neutral. The neutral color is usually made by mixing two or more kinds of dichroic dye. However, large efforts have been required for coordinating the dichroic property of the dyes since the structures of the dyes are largely different from each other and the dichroic properties of them are also different.

As above mentioned, usually known dichroic dyes are insufficient in the performance thereof. Moreover, many problems are caused in the production process of the dye such as that many steps are required for synthesizing the objective substance from the raw materials and large effort is necessary for purifying the objective substance.

Besides, a coordination polymer having a repeating structure by the continuous interaction of metal ions and ligands has both of diversity of the metal ion as an inorganic compound and superior degree of freedom of the molecular design of the ligand as an organic compound. Consequently, it is expected that a spatial and electronic structure, which cannot realized by solely applying of an inorganic or organic compound, can be freely constructed for making possible to appear a new function; cf. Patent Document 4 for example. However, there is no example regarding that the coordination polymer functioning as the dichroic dye is applied to the anisotropic dye layer.

A polarizer having polarization properties has been used for a variety of uses for the purpose of display on the screen, light control, and the like. Further, elements, having functions such as display and light control, which utilize changes of the above polarization properties caused by external energy, have been known.

As the methods for changing the polarization properties of the polarizer, there has been known a method, for example, for changing orientation of liquid crystals by using thereof, or a method for changing orientation of dyes by using liquid crystals incorporating the dyes.

Further, methods for using chromic materials have been known. For example, there have been known a method, in which oriented photochromic dyes are used, and the dyes are colored by ultraviolet light irradiation and faded with visible light and the like to change their polarization properties (refer to Patent Document 5); and a method, in which a thermochromic material is used, which material is semitransparent or transparent under a prescribed temperature and develops color over a prescribed temperature (refer to Patent Document 6).

However, these methods, even though they have a function of polarization filter, are required to optionally carry out a change of the polarization properties, result in problems such as an insufficient. stability of polarization control against environmental fluctuations such as light and temperature, and an insufficient visual feature based on dependency of a viewing angle, in case where they are used, for example, display device in which constant polarization properties are required.

On the other hand, so-called electrochromic elements have been known as a light control element using chromic materials, and they have been utilized for display on the screen which carries out such as amount of light adjustment, and color adjustment by changing light absorption wavelength caused by supplying charges (refer to Patent Document 7).

These electrochromic elements only exhibit functions of light control or switching, and in case where a polarization function is required, a polarizer has to be separately prepared.

Moreover, as the embodiment in which variation of polarization property caused by externally applied energy is utilized, an embodiment is applicable in which a specified part of a polarization element is partially controlled for use. For example, an embodiment for giving the polarization ability to only a part of privacy film or that for displaying images on a displaying apparatus.

Even in such the case, some problems are posed in the usual method such as that the stability of the polarization control as to variation of environmental such as light and temperature is insufficient, the visual property based on the dependency on visual field angle and the constitution for simply and partially controlling is difficultly obtained.

An ellipse polarization plate is known as a functional plate using the polarization element.

The ellipse polarization plate has a retardation plate and a polarization plate and is used as an antireflection plate for reducing the external light reflection of the displaying apparatus using light emission elements.

As the ellipse polarization plate, a circular polarization filter constituted by laminating the polarization element containing the foregoing photochromic dye laminated with the retardation plate, cf. Patent Document 6, and a circular polarization film composed of a film having a specific retardation ability and polarization layer containing a dichroic liquid crystal dye, cf. Patent Document 8, have been known.

However, these elements require changing of the polarization property even though they have the polarization filter function. Therefore, problems such as that the stability of the visibility as to the variation of environmental condition such as light and temperature and the visibility based on the visible field angle dependency are insufficient are posed when the elements are used for an apparatus such as a displaying apparatus requiring stable polarization property.

Moreover, a treatment such as to remove the circular polarization film is necessary when the displaying apparatus or lighting apparatus is used for another purpose such as a mirror.

Patent Document 1: Japanese Patent application Publication No. H3-12606

Patent Document 2: International Publication No. 2002/099480 pamphlet

Patent Document 3: International Publication No. 2005/035667 pamphlet

Patent Document 4: Japanese Patent application Publication No. 2007-112769

Patent Document 5: Japanese Patent application Publication No. 2008-122485

Patent Document 6: Japanese Patent Application Publication No. 2005-538878

Patent Document 7: Japanese Patent Application Publication No. 2007-112957

Patent Document 8: Japanese Patent Publication Application No. 2007-025465

SUMMARY

The invention is attained on the above-mentioned background, and an object of the invention is to provide a dichroic dye layer having high dichroism and high durability, a coordination polymer for the dichroic dye layer, and a polarization element excellent in the polarization ability.

It is another object of the present invention to provide a polarization control film, a polarization control element, a multi-layer polarization control element, and methods for controlling polarization properties, which exhibit good polarization properties, excellent control stability of the polarization properties, and excellent visual feature.

The other object of the invention is to provide a polarization control film, a polarization control element, a multi-layer polarization control element, and methods for controlling polarization properties, which exhibit good polarization properties, excellent control stability of the polarization properties, excellent visual feature, and can be partially controlled in the polarization property.

Further object of the invention is to provide a polarization control element, a multi-layer polarization control element and methods for controlling polarization properties, an ellipse polarization plate for making such the polarization element, and an optical element using the ellipse polarization plate, which can be controlled in the polarization property and exhibit excellent control stability of the polarization properties, excellent visual feature, and can easily provide a multi-functional optical element using the above.

It is found as a result of investigation by the inventors that the anisotropic layer displaying high dichroism and good durability can be obtained by the use of the coordination polymer so as to attain the present invention.

The coordination polymer can be produced by a simple method, and the degree of freedom of molecule design for controlling of the color of it is high. Therefore, the anisotropic dye layer and the polarization element using the coordination polymer of the invention can be manufactured by lower cost and easier method compared with the anisotropic dye layer and the polarization element using usual dichroic dye.

The above object can be attained by the following constitution.

1. An anisotropic dye layer, wherein a coordination polymer is contained.

2. The anisotropic dye layer described in the above 1, wherein the coordination polymer is a linear polymer.

3. The anisotropic dye layer described in the above 1 or 2, wherein the coordination polymer has a partial structure represented by the following Formula 1 in the principal chain thereof.

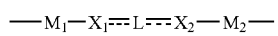

Formula 1

(Wherein $\rightleftharpoons$ is a single bond or a double bond.)

In the formula, $M_1$ and $M_2$ are each a metal ion which may be the same or different, $X_1$ and $X_2$ are each a nitrogen atom, an oxygen atom or a sulfur atom which may be the same or different, and L is a carbon-containing group bonding $X_1$ and $X_2$.

4. The anisotropic dye layer described in any one of the above 1 to 3, wherein the coordination polymer contains a five- or six-member nitrogen-containing heterocyclic ring.

5. The anisotropic dye layer described in any one of the above 1 to 4, wherein the coordination polymer contains a metal ion and a compound represented by the following Formula 2.

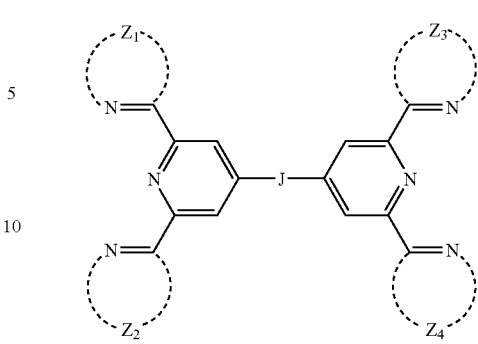

Formula 2

In the above formula, J is a bonding hand or a bivalent bonding group, $Z_1$ to $Z_4$ are each a group of non-metal atoms necessary for forming a five- or six-member nitrogen-containing heterocyclic ring together with the C=N moiety.

6. The anisotropic dye layer described in any one of the above 1 to 5, wherein the coordination polymer contains different kinds of metal.

7. A polarization element, wherein at least one anisotropic dye layer described in any one of the above 1 to 6 is used.

8. A coordination polymer for the anisotropic dye layer, wherein the coordination polymer has a partial structure represented by the following Formula 1 in the principal chain thereof.

Formula 1

($\rightleftharpoons$ is a single bond or a double bond.)

In the formula, $M_1$ and $M_2$ are each a metal ion which may be the same or different, $X_1$ and $X_2$ are each a nitrogen atom, an oxygen atom or a sulfur atom which may be the same or different, and L is a carbon-containing group bonding $X_1$ and $X_2$.

9. A polarization control film, wherein it incorporates oriented dichroic dyes in which light absorption spectrum of the molecule is reversibly changed by receiving and releasing charge.

10. The polarization control film as described in above 9, wherein it is a charge control type polarization control film, in which the control of the polarization properties is carried out by receiving and releasing charge.

11. The polarization control film as described in above 9 or 2, wherein the above receiving and releasing charge is an oxidation-reduction reaction.

12. The polarization control film as described in any one of above 9 to 11, wherein the above-described orientation is in-plane uniaxial orientation.

13. The polarization control element, which comprises the polarization control film as described in any one of above 9 to 12 and a charge supply means.

14. The polarization control element as described in above 13, wherein the above charge supply means has an electrolyte layer and an electrode.

15. The polarization control element as described in above 13 or 14 wherein the above charge supplying means has a constitution by which the supplying of the charge from the charge supplying means can be locally controlled.

16. A method for controlling polarization properties, wherein the polarization control element as described in above 13, 14 or 15 is used.

17. A multi-layer polarization control element, wherein the element has plural layers each composed of the polarization element as described in above 13, 15 or 16 and the orientation directions of a dichroic dye contained in each of the polarization control film of the polarization controlling elements are different from each other.

18. A method for controlling polarization properties wherein the multi-layer polarization control element as described in 17 is used.

19. An ellipse polarization plate, wherein the ellipse polarization plate comprises a retardation plate and the polarization control element as described in above one of 13 or 15.

20. An ellipse polarization plate, wherein a retardation plate and the multi-layer polarization control element as described in 17 are contained.

21. A light emission element, wherein the light emission element incorporates the polarization control element as described in above 13, 14 or 15.

22. A light emission element, wherein the multi-layer polarization element as described in above 17.

23. A light emission element, wherein the ellipse polarization plate as described in above 22 or 23.

24. The light emission element as described in one of above 21 or 23, wherein the light emission element is a displaying element.

25. The light emission element as described in one of above 20 or 22 wherein the light emission element is a lighting element.

26. The light emission element as described in above 24 or 25, wherein the light emission element includes an organic electroluminescent element.

27. A method for controlling polarization properties, wherein the polarization control element, which has the polarization control film incorporating the oriented dichroic dyes in which light absorption spectrum of the molecule is changed by receiving and releasing charge and the charge supply means, is used, and the charge supply from the aforesaid charge supply means to the aforesaid dichroic dyes is controlled, whereby the polarization properties of the aforesaid polarization control film is reversibly changed.

28. The method for controlling polarization properties as described in above 27, wherein the method for controlling the charge supply to the above dichroic dyes is a voltage control method, and a state in which the above polarization control film has polarization properties in a colored state and a state in which the above polarization control film has no polarization property in a non-colored state are reversibly converted.

29. A method for controlling polarization properties, wherein a retardation plate, an ellipse polarization plate having a polarization control film containing the oriented dichroic dyes, light absorption spectrum of the molecule of which is changed by receiving and releasing charge, and a charge supplying means are used, and the polarization properties of the polarization film are reversibly changed by controlling the charge supplied from the supplying means to the dichroic dye.

The dichroic dye layer having high dichroism and high durability, the coordination polymer for the dichroic dye layer, and the polarization element excellent in the polarization ability can be provided by the invention.

It is the effects of the invention to provide a polarization control film, a polarization control element, and a method for controlling polarization properties, which can be partially exhibit good polarization properties, an excellent control stability of the polarization properties against environmental fluctuations such as light and temperature, as well as low dependency on viewing angle and excellent visual feature.

Moreover, a polarization control film, a polarization control element and a polarization property control method can be provided, which exhibit good polarization properties, excellent control stability and visual feature, and the polarization properties can be partially controlled.

Furthermore, a polarization control element, a multi-layer polarization control element and methods for controlling polarization properties, an ellipse polarization plate for making such the polarization element, and an optical element using the ellipse polarization plate, which can be controlled in the polarization property and exhibit excellent control stability of the polarization properties, excellent visual feature, and can easily provide a multi-functional optical element using the above, can be provided.

BRIEF DESCRIPTION OF THE DRAWINGS

FIGS. 7.1 to 7.3 are schematic plan views of another example of the polarization control element of the present invention.

FIGS. 8.1 to 8.7 are schematic plan views of another example of the polarization control element of the present invention.

FIGS. 9.1 to 9.3 are schematic plan views of another example of the polarization control element of the present invention.

PREFERRED EMBODIMENT OF THE INVENTION

Figure 1:
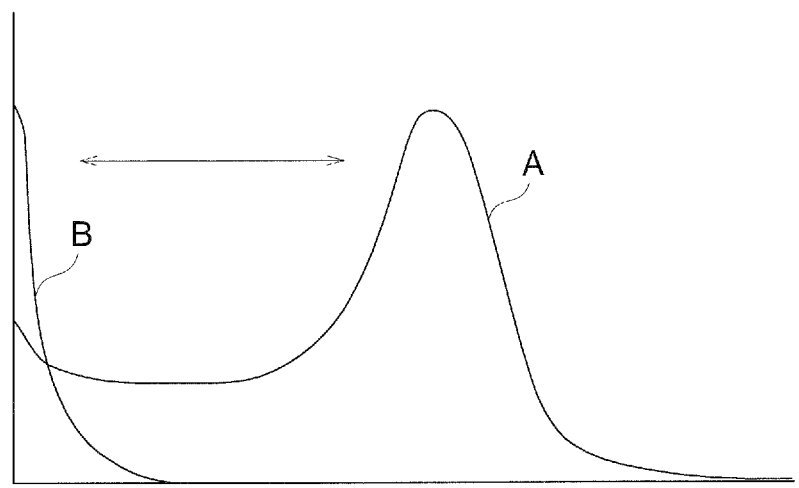
FIG. 1 is a drawing displaying change of light absorption spectrum.

The preferred embodiment of the invention is described in detail below but the invention is not limited thereto.

One of the embodiments of the present invention is a polarization control film, wherein it incorporates oriented dichroic dyes in which absorption wavelength of the molecule is changed by receiving and releasing charge.

In the present invention, in particular, by employing a polarization control film incorporating oriented dichroic dyes in which absorption wavelength of the molecule is changed by receiving and releasing charge, a polarization control film and a polarization control element exhibiting an excellent control stability of the polarization properties, as well as an excellent visual feature can be obtained.

(Polarization Control Film)
(Dichroic Dyes)

The dichroic dye relating to the present invention is one in which light absorption spectrum of the molecule is reversibly changed by receiving and releasing charge.

The sentence "light absorption spectrum of the molecule is reversibly changed by receiving and releasing charge" means that wavelength or intensity of light which a dye absorbs is reversibly changed by receiving and releasing charge of a dye molecule. In the invention, the "dichroic dye is a dye, of which molecular absorption is varied by 2 or more in the extinction variation ratio (major extinction coefficient/minor extinction coefficient) in the wavelength range of from 400 nm to 1800 nm when a voltage within the range of from 0.01 to 1000 V is applied in the presence of an electrolyte. In the above, the "major extinction" is the higher extinction coefficient in the extinction variation at a specific wavelength, and the "minor extinction" is the lower extinction coefficient at the specific wavelength. The extinction variation ratio is preferably 7 or more and more preferably 10 or more.

For instance, Compound 1 in Example of the invention displayed an extinction variation caused by application of 4 V of 11.6 at the maximum absorption of 590 nm. The variation of the extinction coefficient can be determined, for example, by that the electrolyte, in which the dye is dissolved, is placed between transparent electrodes and voltage is applied to the electrodes and the extinction coefficients before and after applying the voltage are measured.

The extinction coefficient is a constant indicating a degree of absorption by a medium when the light gets into the medium, and a value determined by a spectrophotometer which is capable of determining a wavelength having an absorption maximum.

The change of the absorption spectrum is not specifically limited. However, one in which the absorption spectrum is reversibly changed from the range of 400 nm to 1800 nm to the range of 200 nm to 1600 nm is preferable, and one in which the absorption spectrum is reversibly changed from the range of 400 nm to 800 nm to the range of 200 to 400 nm is more preferable.

For example, the absorption wavelength range of the compound in Example of the invention was varied so that the absorption maximum of 590 nm was shifted to less than 400 nm since the electronic state of the dichroic dye was varied by oxidation-reduction reaction.

The variation of the absorption spectrum, in the case of that the wavelength of maximum absorption is varied, is schematically shown in FIG. 1 as an example of variation of absorption spectrum.

In FIG. 1, the extinction coefficient and the wavelength are each plotted on the vertical and horizontal axis, respectively, and the absorption spectrum A before the voltage application and the absorption spectrum B after the voltage application are schematically displayed.

As the dye relating to the invention, ones capable of taking a colored state and a non-colored state in the visible wavelength region corresponding to transfer of the charge is preferable, and ones capable of reversibly taking the colored state and non-colored state corresponding to transfer of the charge are preferably used.

As the embodiment of the charge transfer, for example, oxidation-reduction reaction between the electrode and the dye is cited.

The dichroic dye in the present invention is a dye having anisotropic absorption, namely the transferred light through the dye is varied corresponding to the direction or the transition moment of the dye, and the degree of the absorption anisotropy is varied according to the variation of the absorption spectrum caused by the receiving and releasing charge.

The dye is a dye having a wavelength region in which the extinction coefficient in the direction of the transition moment and that in the direction crossing at right angles with the transition moment are different from each other, and has the region in which a dichroic ratio of not less than 3 measured by the following dichroicity measurement. For example, a dichroic dye having dielectric anisotropy which has a linear skeleton, a planar skeleton or a disc skeleton such as a liquid crystal molecule, and a dichroic dye of which molecular orientation is limited in a specific direction by coagulation or polymerization of the molecules, are suitably usable.

The dichroic ratio (D) is a value obtained by a measurement via a polarizing film analyzer VAP-7070D (produced by JASCO Corp.)

The dichroic dye relating to the present invention includes dyes described in pp.157-159 of "Kinousei Shikiso"(Functional Dyes) (Kodansya Scientific Ltd.), and dyes described in paragraphs (0093)-(0101) in specifications of Japanese Patent No. 4074105. Of these, in particular, preferred are dyes in which an angle between transition moment and a molecular axis of a dye is within ±10 degrees or within 90 ±10 degrees. For example, metal-organic substance complexes, in particular, metal-bis-terpyridine complexes are preferably employed.

Examples of the suitably employed compounds include the following compound.

The coordination polymer having a partial structure represented by the following Formula 1 in the principal chain thereof.

Formula 1

($=$ is a single bond or a double bond.)

In the formula, $M_1$ and $M_2$ are each a metal ion which may be the same or different, $X_1$ and $X_2$ are each a nitrogen atom, an oxygen atom or a sulfur atom which may be the same or different, and L is a carbon-containing group bonding $X_1$ and $X_2$.

The coordination polymer containing a metal ion and a compound represented by the following Formula 2.

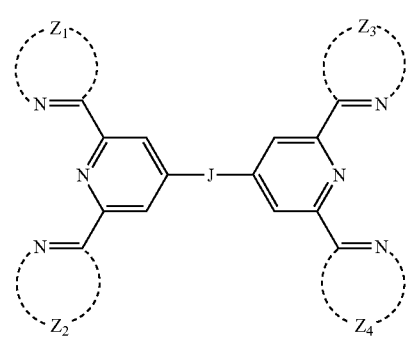

Formula 2

In the above formula, J is a bonding hand or a bivalent bonding group, $Z_1$ to $Z_4$ are each a group of non-metal atoms necessary for forming a five- or six-member nitrogen-containing heterocyclic ring together with the C=N moiety.

In the invention, the "anisotropic dye layer" is a dye layer having anisotropism of electromagnetic property in two directions optionally selected from three directions in the cubic coordinate system constituted by the thickness direction of the dye layer and arbitral in-face two directions crossing at a right angle. The electromagnetic property includes an optical property such as absorption and refraction, and an electric property such as resistance and capacitance. The layer having the optical anisotropism such as absorption and refraction includes a linear polarization layer, a circular polarization layer, a retardation layer and a resistance anisotropic dye layer. Namely, the anisotropic dye layer of the invention can be used as a polarization layer, a retardation layer, or a resistance anisotropic dye layer. Particularly, the anisotropic dye layer is useful as the polarization layer since the layer has absorption within the visible region.

The dichroic ratio of the anisotropic dye layer is determined by the ratio of the absorbing coefficient in the absorbing direction to that in the polarization direction. Accordingly, when the absorption direction in the in-face of the anisotropic dye layer is x-axis and the polarization direction is y-axis, it is preferable that for raising the dichroic ratio that the large number of molecule is oriented so that the component kx of the x-axis of the absorbing coefficient of the used dichroic dye is made as large as possible. On the other words, it is preferred that the number of the molecule oriented in the same direction is made larger on the occasion of film formation by the wet layer forming method because higher dichroic ratio is expected. Therefore, it is considered that larger interaction force between the dye molecules is desirable for accelerating the self organization of the dye.

[Coordination Polymer]

In the invention, the "coordination polymer" is a polymer formed by metal ions and ligands alternatively lined up in a form of long chain, in which bridging structure is formed by the multi-functional ligands (bridging ligands) coordinated with different metal ions. Namely, the "coordination polymer" means a polymer taking the form of . . . -(metal ion)-(ligand)-(metal ion)-(ligand)-(metal The present invention is characterized in that the anisotropic dye layer contains the coordination dye. The coordination polymer functions as dye by absorbing light caused by transition accompanied with transfer of electron between the ligand and the metal ion. It is surprisingly found by the inventors that the dye layer using the coordination polymer functioning as dye and formed by the dry or wet layer forming method has anisotropism. It is presumed that such the effect caused by that molecular orientation of the coordination polymer is improved; the agreement degree of the direction of transition accompanied with electron transfer between each of the ligands and metal ions constituting the coordination polymer is raised, even though the detail is not cleared yet.

The metal ion is not limited as long as it can form the coordination polymer, and is preferably an ion of transition metal selected from metals of Groups VIII, Ib, IIb, IIIa, Iva, VIa and VIIa. Concretely, a salt of bivalent metal such as Ni, Cu, Co, Mn, Zn, Fe, Ru, Ti, Pd or Pt are cited, more preferably the bivalent ion of Ni, Cu, Co, Mn, Fe or Ru, and particularly preferable the bivalent ion of Fe.

The metal ions in the coordination polymer may be constituted by the same ions or different kinds of ion, and the ligands may be constituted by the same ligands or different kinds of ligand.

In the coordination polymer, an anion necessary for neutralizing the metal cation is in existence. When the charge of the ligand is neutral, a counter anion is in existence separately for neutralizing the metal cation. Besides, when the ligand is anion, the counter anion for neutralizing the metal cation is the ligand itself or one separately existing.

Examples of the counter anion include an aliphatic carboxylic ion such as acetate ion and propionate acid ion, an aromatic carboxylic acid ion such as benzoate ion, sulfate ion, a sulfonate ion such as methanesulfonate ion and tosylate ion, a halogen ion such as chloride ion and bromide ion, phosphate ion, a phosphoric ester ion such as monoethyl phosphate ion and diethyl phosphate ion, a hydroxyl ion, a carbonate ion, a polyoxymetalate ion, $PF_6^-$, $BF_4^-$ and $SbF_6^-$, these ions may be combined in the coordinate polymer. Though these counter ions are used in many cases in a form of the pair ion (pair salt) of the metal ion on the occasion of synthesizing the coordination polymer, they may be used by slat changing after the synthesis.

The ligand is not specifically limited as long as it is a multi-functional ligand, for example, a compound having plural nitrogen atoms, oxygen atoms or sulfur atoms each having a non-covalent electron pair is cited.

Though the metal salt to be used as the raw material in the occasion of synthesizing of the coordination polymer is not specifically limited, and an acetate or chloride of the metal is preferred from the viewpoint of the cost and the facility of procurement.

The range of the number average molecular weight of the coordination polymer is from 1,000 to 100,000, and preferably from 2,000 to 20,000 from the viewpoint of solubility in various kinds of solvent. The range of the weight average molecular weight of the coordination polymer is from 1,000 to 500,000, and preferably from 5,000 to 100,000 from the viewpoint of solubility and film forming property.

(Molecular Weight Measuring Method)

The number average molecular weight and the weight average molecular weight are measured by gel permeation chromatography.

The measuring conditions are as follows:
Solvent: 1M-sodium acetate/acetonitrile=7/3
Column: TSK gel α-M, and α-2500 (manufactured by Tosoh Corp.) were connected for use.
Column temperature: 40° C.
Sample concentration: 0.1% by weight
Detector: RI Model 504 (manufactured by GL Sciences Inc.)
Pump: L6000 (manufactured by Hitachi Ltd.)
Flowing rate: 0.5 ml/min
Calibration curve: In terms of standard PEO·PEG The coordination polymer in the invention has absorption in the visual region caused by charge moving transition between the ligand and the metal ion, and the rate of the charge movement is changed depending on the combination of the ligand and the metal ion. Therefore, desired color can be obtained by suitably combing the ligand and the metal ion. The moving rate of charge can be also controlled by exchanging the counter ion.

[Linear Polymer]

In the invention, the "linear polymer" is a polymer constituted by linearly bonding the constitution unit such as a monomer as defined in "Basic Polymer Science", Tokyo Kagaku Dojin, and is also referred to as chain polymer or one dimensional polymer.

In the invention, the coordination polymer is preferably a linear polymer, and the ligand constituting the coordination polymer is preferably a bifunctional ligand.

It is found by the inventors that the coordination polymer having high linearity is useful from the viewpoint of the absorption anisotropism for the anisotropic dye layer, particularly for the polarization element requiring the polarization function because the transition moments of light absorption caused by each of the charge moving transition are easily made uniform in such the coordination polymer.

The coordination polymer of the invention is preferably a coordination polymer having a partial structured represented by the foregoing Formula 1 for obtaining the anisotropism and raising the polarization ability.

[Partial Structure Represented by Formula 1]

In the foregoing Formula 1, $M_1$ and $M_2$ are each a metal ion, and they may be the same as or different from each other.

In the above Formula 1, as the metal ion represented by $M_1$ or $M_2$ is preferably an ion of transition metal selected from the metal atoms included in Groups VIII, Ib, IIb, IIIc, IVa, Va, Via and VIIa even though the metal ion is not specifically limited. Concretely, bivalent ions of Ni, Cu, Co, Mn, Zn, Fe, Ru, Ti, Pd and Pt are cited, the bivalent ions of Ni, Cu, Co, Mn, Fe and Ru are preferably cited, and the bivalent ion of Fe is particularly preferred.

In the above Formula I, $X_1$ and $X_2$ are each a nitrogen atom, an oxygen atom or a sulfur atom, and they may be the same as or different from each other. $X_1$ and $X_2$ are each preferably a nitrogen atom.

In the above Formula 1, L is a carbon-containing group bonding $X_1$ and $X_2$, and L constitutes a bifunctional organic ligand together with $X_1$ and $X_2$. Examples of the organic ligand include bis(terpyridine), bis(phenanthroline) and bis (bipyridine).

The coordination polymer of the invention having the partial structure represented Formula 1 preferably has a five- or six-member nitrogen-containing heterocyclic ring for appearing the anisotropism and raising the polarization ability since the coordination force between the metal is increased.

Examples of the five- or six-member nitrogen-containing-heterocyclic ring include a pyridine ring, a pyrazole ring, a imidazole ring, an pyrazine, a pyrimidine ring, a pyridazine ring, a triazine ring, a triazole ring, an isothiazole ring, a thiadiazole ring, an oxazole ring, an isoxazole ring, an oxadiazole ring, a triazole ring, a tetrazole ring, a quinoline ring, an isoquinoline ring, a benzothiazole ring, a benzoisothiazole ring, a benzoxazole ring, a benzoisoxazole ring, a benzopyrazole ring and a benzimidazole ring. The ring is preferably a pyridine ring, a pyrazole ring and an imidazole ring, and particularly preferably a pyridine ring.

The coordination polymer having the five- or six-member nitrogen-containing heterocyclic ring in the invention is preferably a coordination polymer incorporating the metal ion and a compound represented by the forgoing Formula 2 is preferably for appearing the anisotropism and raising the polarization ability since such the coordination polymer is superior in the linearity and the coordination force is raised therein.

As the metal ion represented by $M_1$ or $M_2$ is preferably an ion of transition metal selected from the metal atoms included in Groups VIII, Ib, IIb, IIIc, IVa, Va, Via and VIIa even though the metal ion is not specifically limited. Concretely, bivalent metal ions of Ni, Cu, Co, Mn, Zn, Fe, Ru, Ti, Pd and Pt are cited, the bivalent ions of Ni, Cu, Co, Mn, Fe and Ru are preferably cited, and the bivalent ion of. Fe is particularly preferred.

[Compound Represented by Formula 2]

In the foregoing Formula 2, J is a simple bonding hand or a bivalent bonding group. Examples of the bivalent bonding group include an alkylene group, which may have a substituent, such as a methylene group, an ethylene group and a trimethylene group, a cycloalkylene group, which may have a substituent, such as a cyclohexylene group, an alkenylene group, which may have a substituent, such as an ethenylene group, a propenylene group and a butenylene group, a ethynylene group, an arylene group, which may have a substituent, such as a phenylene group and a naphthylene group, a carbonyl group, an oxygen atom, a nitrogen atom, a sulfur atom such as a thioether group and a sulfonyl group, and a combination of these bonding group such as an aralkylene group, an ester group, an alkoxycarbonyl group, a carbamoyl group, an amido group, a sulfamoyl group, a sulfonamide group, a disulfide group, a hydrazine group and an azo group. J is preferably an arylene group, more preferably a phenylene group, and particularly preferably a 1,4-phenylene group and a combination of 1,4-phenylene groups themselves.

Examples of substituent which may be the substituent of the bivalent bonding group represented by J in Formula 2 include an alkyl group such as a methyl group, an ethyl group, a propyl group, an isopropyl group, a tert-butyl group, a pentyl group, a hexyl group, an octyl group, a dodecyl group and a trifluoromethyl group, a cycloalkyl group such as a cyclopentyl group and a cyclohexyl group, an aryl group such as a phenyl group and a naphthyl group, an acylamino group such as an acetylamino group and a benzoylamino group, an alkylthio group such as a methylthio group and an ethylthio group, an arylthio group such as a phenylthio group and a naphthylthio group, an alkenyl group such as a vinyl group, a 2-propenyl group, 3-butenyl group, 1-methyl-3-propenyl group, a 3-pentenyl group, 1-methyl-3-butenyl group, a 4-hexenyl group and a cyclohexenyl group, a halogen atom such as a chlorine atom, a bromine atom and an iodine atom, an alkynyl group such as a propargyl group, a heterocyclic group such as a pyridyl group, a thiazolyl group, an oxazolyl group and an imidazolyl group, an alkylsulfonyl group such as a methylsulfonyl group and an ethylsulfonyl group, an arylsulfonyl group such as a phenylsulfonyl group and a naphthylsulfonyl group, an alkylsulfinyl group such as a methylsulfinyl group, an arylsulfinyl group such as a phenylsulfinyl group, a phosphono group, an acyl group such as an acetyl group, a pivaloyl group and a benzoyl group, a carbamoyl group such as an aminocarbamoyl group, a methylcarbonyl group, a dimethylaminocarbonyl group, a butylaminocarbonyl group, a cyclohexylaminocarbonyl group, a phenylaminocarbonyl group and a 2-pyridylaminocarbonyl group, a sulfamoyl group such as an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group and a 2-pyridylaminosulfonyl group, a sulfonamido group such as a methanesulfonamido group and a benzenesulfonamido group, a cyano group, an alkoxy group such as a methoxy group, an ethoxy group and a propoxy group, an aryloxy group such as a phenoxy group and a naphthyloxy group, a heterocycloxy group, a siloxy group, an acyloxy group such as an acetyloxy group and a benzoyloxy group, a sulfonic acid group and its salt, an aminocarbonyloxy group, an amino group such as an amino group, an ethylamino group, a dimethylamino group, a butylamino group, a cyclopentylamino group, 2-ethylhexylamino group and a dodecylamino group, an anilino group such as a phenylamino group, a chlorophenylamino group, a toluidino group, an anisidino group, a naphthylamino group and a 2-pyridylamino group, an imino group, an ureido group such as a methylureido group, an ethylureido group, a pentylureido group, a cyclohexylureido group, an octylureido group, a dodecylureido group, a phenylureido group, a naphthylureido group and a 2-pyridylaminoureido group, an alkoxycarbonylamino group such as a methaxycarbonylamino group, a and phenoxycarbonylamino group, alkoxycarbonyl group such as methoxycarbonyl group, an ethoxycarbonyl group and a phenoxycarbonyl group, an aryloxycarbonyl group such as a phenoxycarbonyl group, a heterocyclothio group, a thioureido group, a carboxyl group and its salt, a hydroxyl group, a mercapto group, and a nitro group. These substituents may be further substituted by the above substituent.

In Formula 2, $Z_1$ to $Z_4$ are each a group of non-metal atoms necessary for forming a five- or six-member nitrogen-containing heterocyclic ring together with the C=N moiety.

Concrete examples of the nitrogen-containing heterocyclic ring include a pyridine ring, a pyrazole ring, an imidazole ring, a pyrazine ring, pyrimidine ring, pyridazine ring, a triazine ring, a triazole ring, an isothiazole ring, a thiadiazole ring, an oxazole ring, an isoxazole ring, an oxadiazole ring, a triazole ring, a tetrazole ring, a quinoline ring, an isoquinoline ring, a benzothiazole ring, a benzoisothiazole ring, a benzoxazole ring, a benzoisoxazole ring, a benzopyrazole ring and a benzimidazole ring. The heterocyclic ring is preferably a pyridine ring and a benzimidazole ring and particularly preferably a pyridine ring. These rings may have a substituent. As the substituent, the same as those described as the groups, which may be the substituent of the bivalent bonding group represented by J, can be applied, and the group further may be substituted by the same groups. $Z_1$ to $Z_4$ may be the same as or different form each other.

[Coordination Polymer for Anisotropic Dye Layer]

The coordination polymer to be used for the anisotropic dye layer of the invention is characterized in that the polymer has the partial structure represented by Formula 1 in the principal chain thereof.

In the foregoing Formula 1, $M_1$ and $M_2$ are each a metal ion which may be the same or different, and $X_1$ and $X_2$ are each a nitrogen atom, oxygen atom or a sulfur atom which may be the same or different. L is a carbon-containing group bonding $X_1$ and $X_3$.

In the above Formula 1, as examples of $M_1$, $M_2$, $X_1$, $X_2$ and L, the same as those described above can be cited, and a counter ion the same as described above is also applicable.

The coordination polymer of the invention to be used in the anisotropic dye layer which has the partial structure represented by Formula 1 in the principal chain thereof is superior in the linearity and useful for the anisotropic dye layer, particularly for the polarization layer requiring the polarization function from the viewpoint of the anisotropic absorption. Moreover, the molecular interaction between the coordination polymer and a polymer used in the combination therewith or that between the coordination molecules themselves can be optionally controlled by selecting the kind or combination of the terminal group or the side substituting group of the principal chain of the coordination polymer. The coordination polymer of the invention can be used to the anisotropic dye layer for various uses requiring the heat resistivity since the coordination polymer is excellent in the heat resistance.

Concrete examples of the coordination polymer relating to the invention are listed below but the invention is not limited to them. The "n" in the structural formulas of the exemplified compounds means that the structure in the parenthesis is repeated for plural times.

Exemplified Compound 1

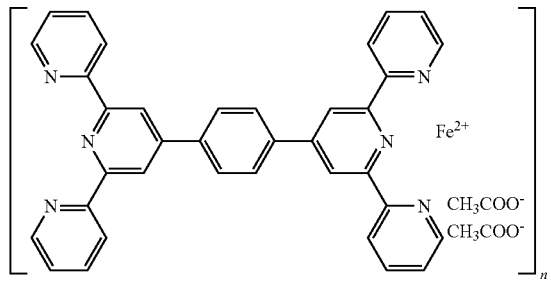

Exemplified Compound 2

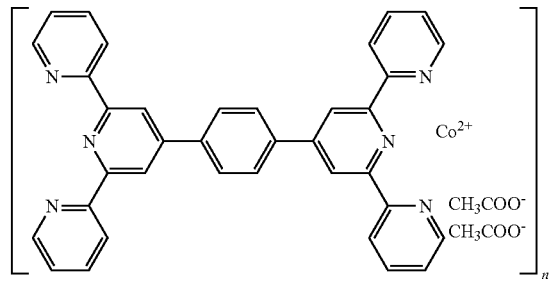

Exemplified Compound 3

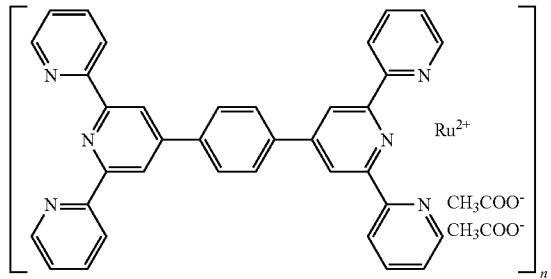

Exemplified Compound 4

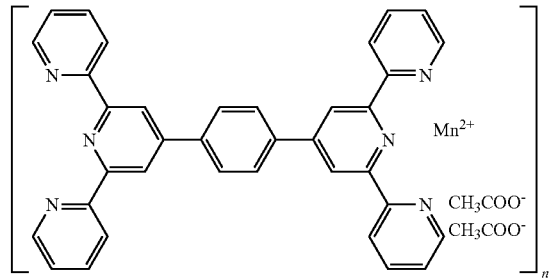

Exemplifid Compound 5

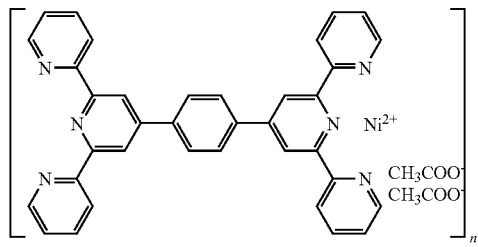

Exemplified Compound 6

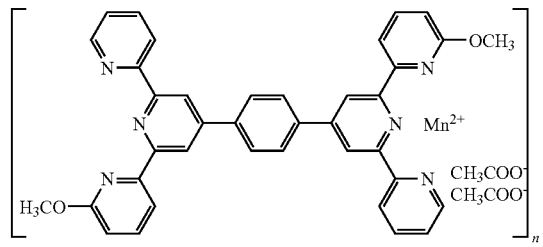

-continued
Exemplified Compound 7
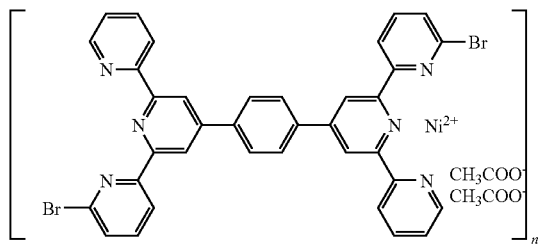
Exemplified Compound 8
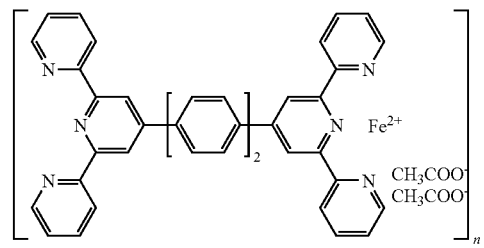
Exemplified Compound 9
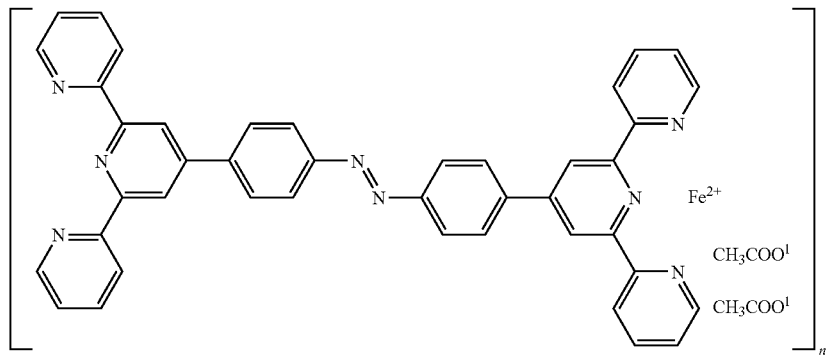
Exemplified Compound 10
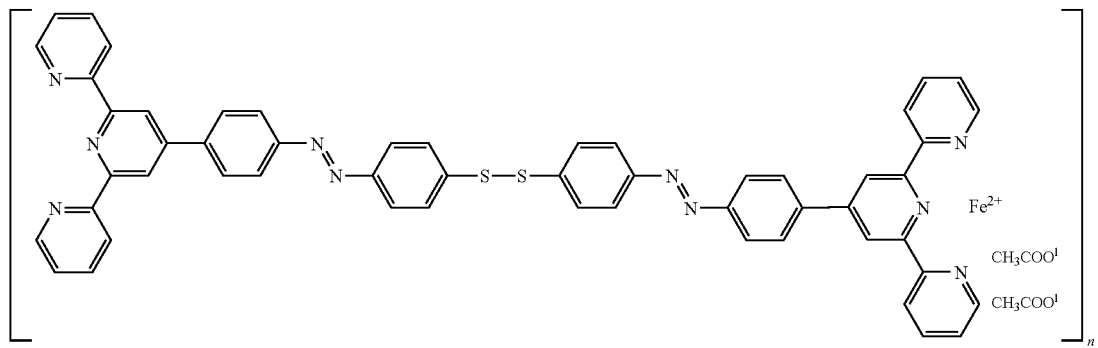
Exemplified Compound 11
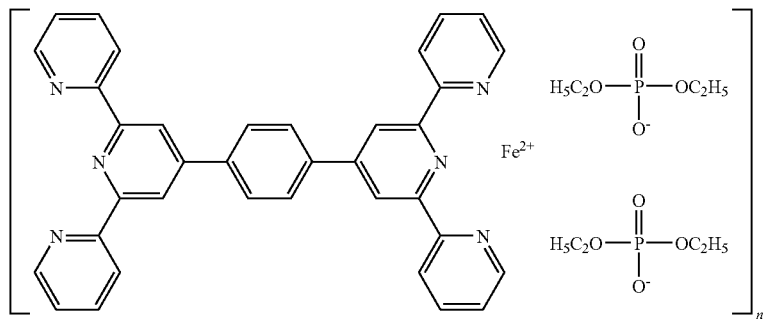
Exemplified Compound 12
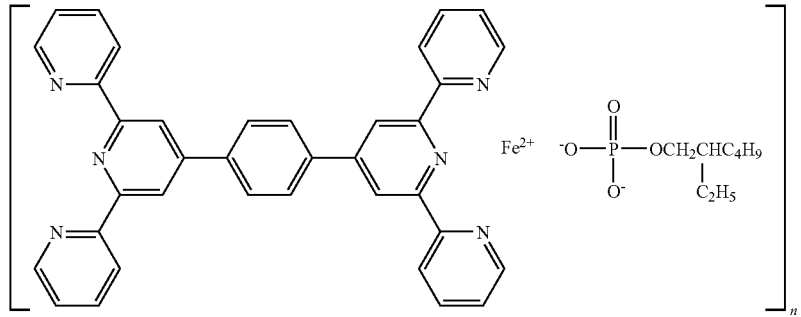

-continued
Exemplified Compound 13
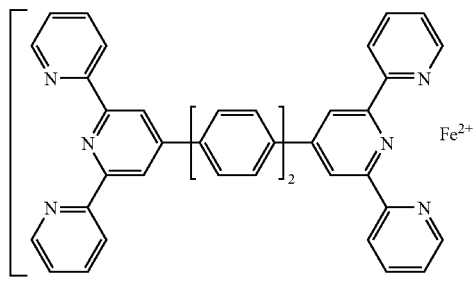
Exemplified Compound 14
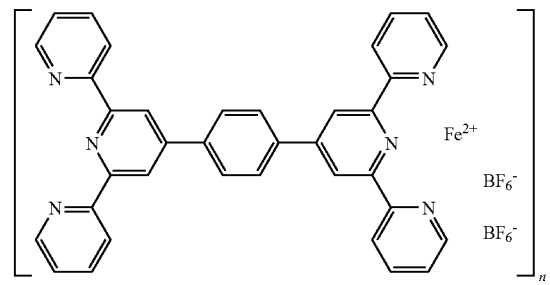
Exemplified Compound 15
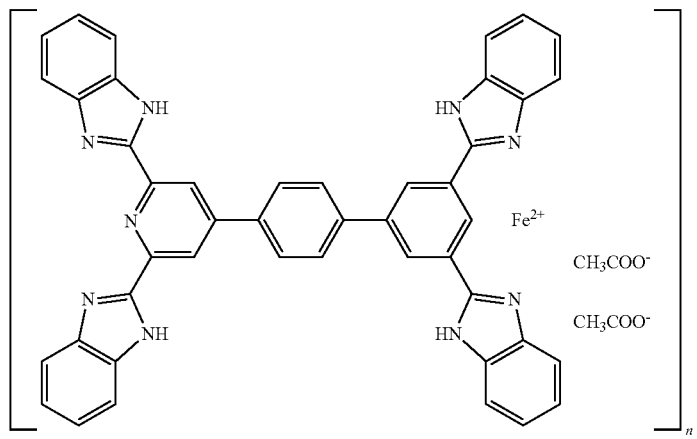
Exemplified Compound 16
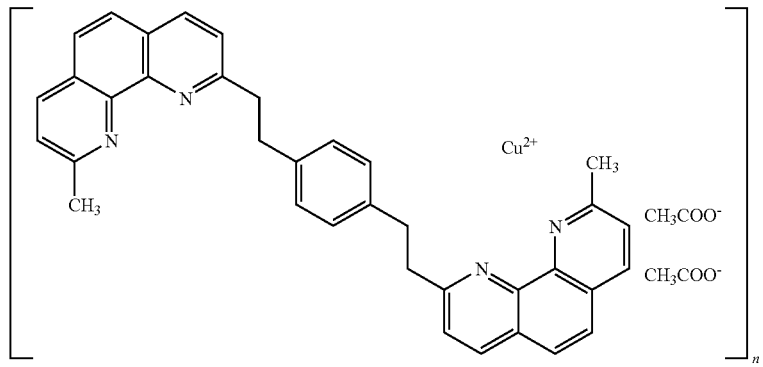
Exemplified Compound 17
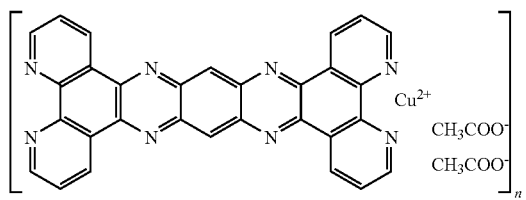
Exemplified Compound 18
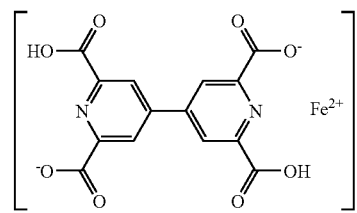
Exemplified Compound 19
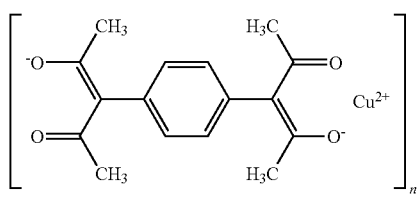
Exemplified Compound 20
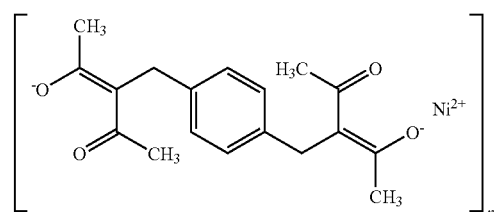

-continued
Exemplified Compound 21
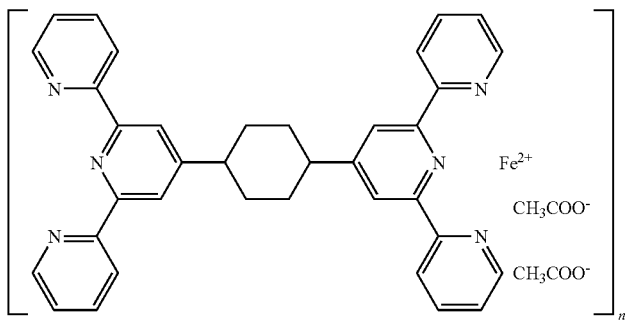
Exemplified Compound 22
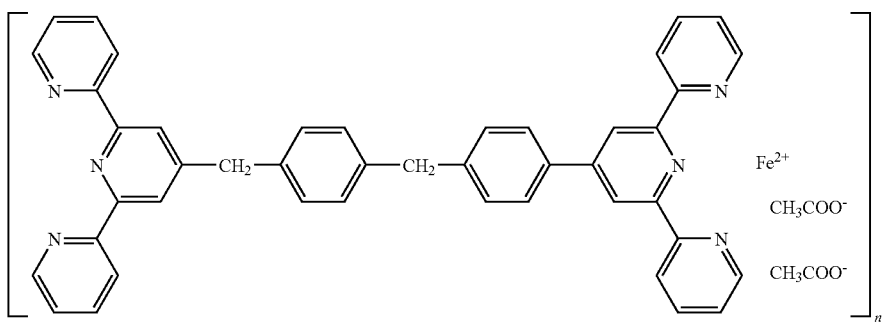
Exemplified Compound 23
Exemplified Compound 24
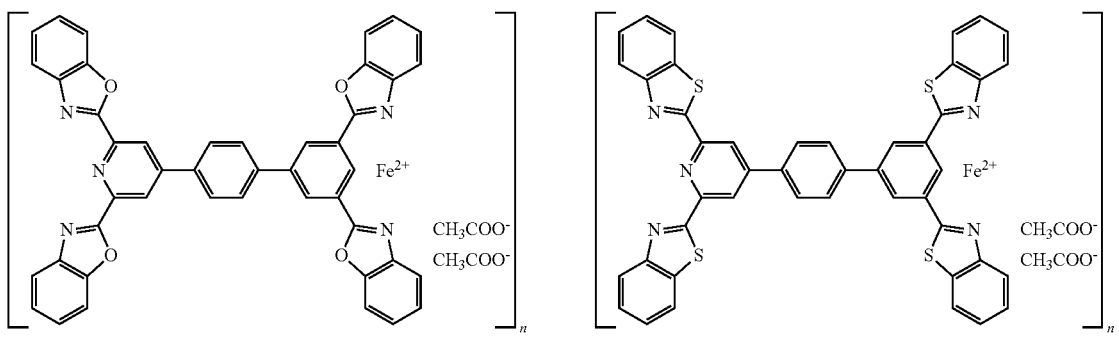
Exemplified Compound 25
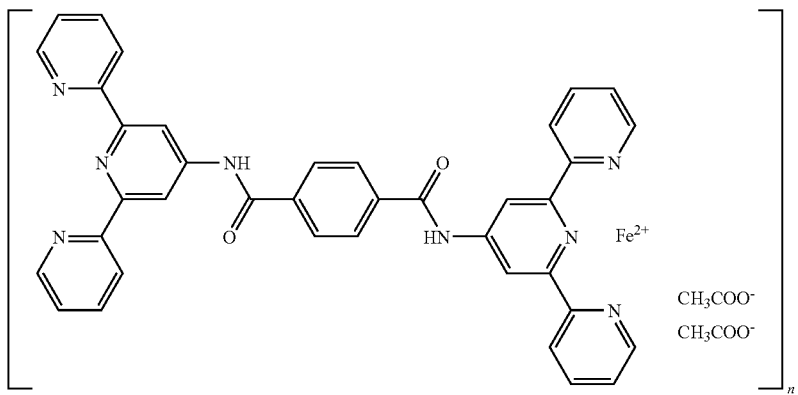

-continued

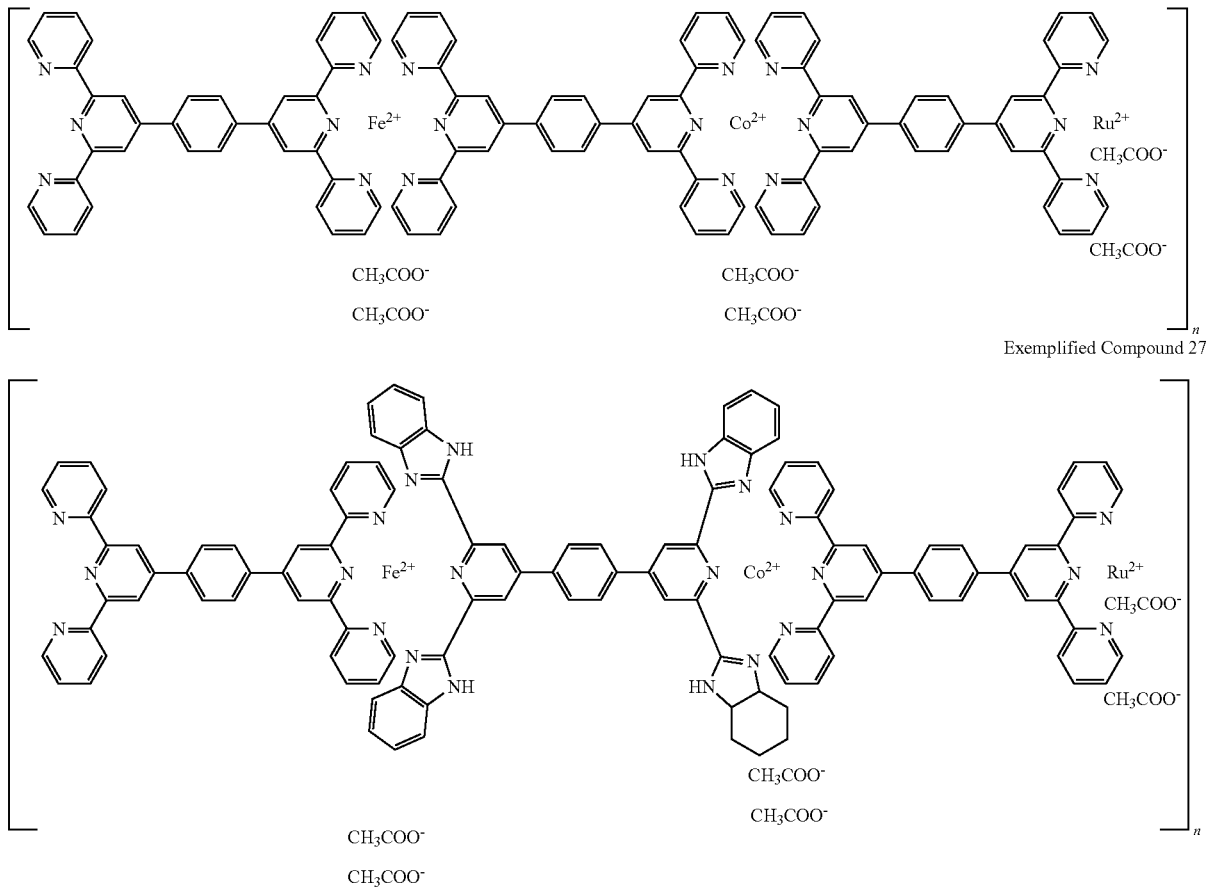

Exemplified Compound 26

Exemplified Compound 27

[Producing Method]

The above compounds can be produced by usually known methods. The ligands and the coordination polymer can be synthesized by referring the method described in Synthesis 2006, No. 17, 2873-2878, and Japanese Patent application Publication No. 2007-112769, for example.

The feature of the anisotropic dye layer of the invention is that the dye layer contains the above coordination polymer of the invention. The anisotropic dye layer may contain one kind of the coordination polymer solely or two or more kinds of that in an optional combination and ratio.

The anisotropic dye layer of the invention may contain one or more kinds of another dye additionally to the one or more kinds of the coordination polymer of the invention. The anisotropic dye layers having various colors can be prepared by combination use with a suitably selected dye other than the coordination polymer of the invention within the range in which the orientation of the dye is not lowered. A layer having deep color is preferred for the use as the polarization layer, and the combination showing neutral color in the visual region of from 380 to 780 nm (neutral gray, for example, that satisfying $\sqrt{\{(a^*)^2+(b^2)\}} \leq 5$ in the L*a*b* color expression system) is preferable for the displaying element, particularly for the color displaying element.

The hue of coordination polymer of the invention can be controlled by changing the metal ion; therefore, it is preferred to contain two or more kinds of ions different from each other to the coordination polymer for making the neutral color without use of another dye.

When the anisotropic dye layer of the invention contains dye other than the coordination polymer of the invention, hereinafter referred to as combining dye, examples of the combining dye include C. I. Direct Yellow 12, C. I. Direct Yellow 34, C. I. Direct Yellow 86, C. I. Direct Yellow 142, C. I. Direct Yellow 132, C. I. Acid Yellow 25, C. I. Direct Orange 39, C. I. Direct Orange 72, C. I. Direct Orange 79, C. I. Acid Orange 28, C. I. Direct Red 39, C. I. Direct Red 79, C. I. Direct Red 81, C. T. Direct Red 83, C. I. Direct Red 89, C. I. Acid Red 37, C. I. Direct Violet 9, C. I. Direct Violet 35, C. I. Direct Violet 48, C. I. Direct Violet 57, C. I. Direct Blue 1, C. I. Direct Blue 67, C. I. Direct Blue 83, C. I. Direct Blue 90, C. I. Direct Green 42, C. I. Direct Green 51 and C. I. Direct Green 59.

The ratio of the water-soluble dye of the invention to the total amount of the dyes (the total amount of the coordination polymer of the invention and the combining dye) is usually not less than 70% by weight, preferably not less than 85% by weight, and further preferably not less than 95%, for sufficiently obtaining the effect of the coordination polymer of the invention even when the anisotropic dye layer of the invention contains the above combining dye other than the coordination polymer of the invention.

The anisotropic dye layer of the invention is preferably prepared by later-mentioned dry layer forming method or wet layer forming method using a composition containing one or more kinds of coordination polymer, hereinafter referred to as the dye composition of the invention. In the composition of the invention, the other dye (combining dye) may be used additionally to the above coordination polymer of the invention in the range in which the orientation is not lowered. Thus the anisotropic dye layers each having various colors can be prepared.

The dye composition of the invention usually further contains a solvent, and the coordination polymer of the invention and the combining dye used according necessity exist in the composition in a form of dissolved or dispersed in the solvent. The coordination polymer of the invention to be contained in the dye composition preferably contains the compound represented by the foregoing Formula 2 from the viewpoint of the solubility in the solvent.

Water, a water-miscible organic solvent or a mixture of them are suitable as the solvent. Concrete examples of the solvent include an alcohol type solvent such as methyl alcohol, ethyl alcohol, isopropyl alcohol and glycerol, a glycol type solvent such as ethylene glycol and diethylene glycol, and a cellosolve type solvent such as methyl cellosolve and ethyl cellosolve; they may be used singly or as a mixed solvent.

Besides, a water-immiscible organic solvent, a fatty acid ester type solvent such as ethyl acetate, an aromatic hydrocarbon type solvent such as toluene and a halogen type solvent such as dichloromethane and chloroform are usable, and a mixture solvent of two or more kinds of such the water-immiscible organic solvent and the above water-miscible organic solvent is also usable.

When the dye composition of the invention is a solution containing such the solvent, the concentration of the dye (the coordination polymer of the invention and the combining dye added according to necessity) is within the range of usually not less than 0.01% by weight, preferably not less than 0.1% by weight, more preferably not less than 0.5% by weight, and usually not more than 50% by weight, preferably not more than 25% by weight, particularly preferable not more than 20% by weight, and most preferably not more than 15% by weight. The sufficient dichroic property cannot obtain in the obtained anisotropic dye layer when the dye concentration is too low, and precipitation of the dye is possibly caused when the concentration is too high.

In the dye composition of the invention, an additive such as a surfactant and a pH controlling agent may be contained. Such the additives are usually used by dissolving in a solvent.

The additive such as the surfactant can be added to the dye composition for improving the wetting ability to the substrate and the coating suitability. As the surfactant, any of anionic, cationic, nonionic ones are usable. The adding concentration in the dye composition of the surfactant is preferably from 0.05% to 0.5% by weight and more preferably not more than 0.5% by weight, which is the amount sufficient for obtaining the objective effects and not inhibiting the orientation of the dye.

Known pH controlling agent such as an acid and an alkali may be added to the dye composition of the invention at a time of before, after or during the mixing of the components of the dye composition to control the pH for the purpose of inhibiting the instability such as formation of salt or coagula of the dye. It is preferable that the pH of the dye composition is adjusted usually to 5 to 9, and particularly 6 to 8.

Moreover, known additives described in "Additives for Coating", edited by J. Bieleman, Willey-VCH (200) are usable.

The anisotropic dye layer of the invention is prepared by the later-described dry or wet layer forming method using the above mentioned dye composition of the invention. The anisotropic dye layer formed by the wet layer forming method is more preferable than that formed by the dry layer forming method with stretching of the formed film, because high dichroic property is obtained by raising the molecular orientation in the anisotropic dye layer by utilizing the intermolecular action between the dye molecules.

The anisotropic dye layer can be formed on a high thermal resistive substrate such as glass so that a high thermal resistive polarization element can be obtained. Such the polarization element is preferable since which can be used in the use requiring high thermal resistance such as a liquid crystal projector and a panel to be installed in car.

Among the layer forming methods, the dry layer forming method includes a method in which polymer is formed into a film and the film is dyed by the dye composition of the invention, a method in which a solution of polymer is dyed by adding the dye composition of the invention and formed into a non-stretched film and then the film is stretched, and a method in which the dye composition is evaporated under vacuum and deposited onto a substrate such as glass. As the constitution material of the film to be dyed by the dye composition of the invention, a polymer having high affinity with the dye such as polyvinyl alcohol) is cited.

As the wet layer forming method, a known method such as that the dye composition is prepared into a form of coating liquid and coated onto a substrate such as glass and then the dye is oriented and laminated.

Examples of the coating method include the methods described in "Coating Technology", pp. 253-277, Y. Harazaki, Asakura Shoten Co., Ltd., "Creation and Application of Molecular Cooperation Material", pp. 118-149, edited by K. Ichimura, CMC Press Co., Ltd., Mar. 3, 1998, a spin coating method, spray coating method, a bar coating method, a roller coating method and a blade coating method.

The temperature of the dye composition at the time of the coating is within the range of not less than 40° C. and usually not more than 80° C., and preferably not more than 40° C. The humidity is within the range of not less than 10% RH and usually not more than 80% RH, and preferably not more than 30% RH.

In the wet layer forming method, the dye layer is formed through the coating process of the dye composition of the invention and the drying process, and these processes are preferably carried out under condition suitable for keeping the high dimensional molecular orientation state formed by high lyotropic liquid crystal property caused by self organization of the dye.

Rapidly temperature rising is not preferable also in the drying process. The preferable drying condition is usually from 0° to 120° C. and preferably from 10° C. to 110° C., though natural drying is usually preferred. The humidity is usually not less than 10% RH, preferably not less than 30% RH, and not more than 80% RH.

Glass, film of resin such as cellulose ester (acetate, diacetate and acetate propionate, for example), acryl, polyester and urethane are usable as the substrate. Moreover, an orientation treatment layer or a fluororesin layer may be provided on the surface of such the film for controlling the orientation direction of the dichroic dye by known methods such as that described in "Liquid Crystal Hand Book" pp. 226-339, Maruzen Co. Ltd., Oct. 30, 2000. The state of surface energy of the film may be modified by a combination of light irradiation, corona treatment or plasma treatment additionally to the above treatment.

The anisotropic dye layer of the invention is preferably used with a protective layer provided thereon. The protective layer is formed by lamination of a transparent polymer layer such as a film of cellulose ester, acryl, polyester, polyimide or urethane and served for practical use.

The anisotropic dye layer of the invention displays high dichroic ratio, and one having a dichroic ratio of preferably not less than 9, more preferably not less than 12, and particularly not less than 15, is used. The dichroic ratio is measured by the following method.

[Measuring Method of Dichroic ratio]

Dichroic ratio D is determined by that the transmittance of the anisotropic layer is measured by a spectral photometer (Multi Chanel Photo Detector MCPD 2000 manufactured by Otsuka Electronic Co., Ltd.) in which an iodine type polarization element is inserted in the incidental light pass, and then the ratio is calculated by the following expressions.

Dichroic ratio $D=Az/Ay$ $Az=-\log(Tz)$ $Ay=-\log(Ty)$

Tz: Transmittance of light polarized in the absorbing axis direction of the dye layer Ty: Transmittance of light polarized in the polarizing axis direction of the dye layer The thickness of the anisotropic dye layer of the invention formed by the wet layer forming method on the substrate is usually preferably not less than 50 nm, more preferably not less than 100 nm, and usually preferably not more than 50 μm, more preferably not more than 10 μm, and further preferably not more than 1 μm.

When the anisotropic dye layer of the invention is used as the polarization filter of a liquid crystal display or an organic EL display, the anisotropic dye layer of the invention may be directly formed on the electrode substrate constituting the displays or the substrate on which the anisotropic dye layer is formed may be used as the constituting member of such the displays.

The anisotropic dye layer of the invention functions as the polarization layer for forming linearly polarized light, circularly polarized light or elliptically polarized light. Furthermore, various anisotropic functions such as refraction anisotropism and conductivity anisotropism can be given to the anisotropic dye layer of the invention according to selection of the layer formation process, substrate and dye composition, thus various kinds of polarization elements usable for many uses can be prepared.

The anisotropic dye layer of the invention has an advantage that the layer can be directly formed on a thermal resistive substrate such as glass and a polarization element excellent in the thermal resistance can be obtained, additionally to the merit that the layer is excellent in the dichroic ability. Therefore, the anisotropic dye layer of the invention can be suitably applied to not only the liquid crystal display and the organic EL display but the uses requiring high thermal resistance such as the liquid crystal projector and the panel to be installed in a car.

[Polarization Element]

The polarization element of the invention is characterized in that the element has at least the anisotropic dye layer of the invention. The polarization element may be one composed of the anisotropic dye layer only or one composed of a suitable substrate on which the anisotropic dye layer of the invention is formed. The polarization element composed of the substrate having thereon the anisotropic dye layer is referred to as the polarization element including the substrate.

When the polarization element of the invention is prepared by forming the anisotropic dye layer on the substrate, the anisotropic dye layer may be used as a laminated element formed by laminating with an adhesive layer, and layers each having various optical functions such as the function of an orientation layer, a retardation film, a brightness increasing, a reflection film, a semitransparent reflection film or a diffusion film, additionally to the foregoing protection layer, these layers may be formed by the wet layer forming method.

These layers having the optical functions can be formed by the following methods for example.

The layer having the function of retardation film can be formed by providing the stretching treatment described in Japanese Patent Publication Nos. 2841377 and 3094113, or the treatment described in Japanese Patent Publication No. 3168850, for example.

The layer having the function of brightness increasing layer can be formed by forming fine pores by the method described in Japanese Patent application Publication Nos. 2002-169025 and 2003-29030, or by piling two or more layers of cholesteric liquid crystal layers different from each other in the central wavelength of selective reflection.

The layer having the function of reflection film or the semitransparent reflection film can be formed by a metal layer formed by a vapor deposition or spattering.

The layer having the function of diffusion film can be formed by coating a resin solution containing fine particles as the protection layer.

The layer having the function of retardation film or optical compensation film can be formed by coating and orienting a liquid crystal compound such as a discotic liquid crystal compound and a nematic liquid crystal compound.

(Orientation)

The polarization control film of the invention incorporates above-described oriented dichroic dyes.

The term "oriented" means that a dye molecule (hereinafter simply referred to as a dye) is arranged in a certain direction, and exhibits a polarization degree of 50 or more when determined via a polarizing film analyzer VAP-7070D (produced by JASCO Corp.)

The polarization control film of the present invention incorporating the oriented dichroic dyes may be a film in the form of liquid or a film in the form of a solid.

The polarization control film of the present invention preferably has a thickness of 50 nm to 500 μm, and especially of 100 nm to 10 μm.

The method for orientating dyes includes methods using an electric field, a magnetic field, wind currents, liquid flow, an oblique vapor deposition, rubbing, a photo-alignment film, substrate irregularity, difference in wettability, or shearing.

In case of a film in the form of liquid, the dye orientation can be achieved by incorporating a dye such as described above into a solvent by about 2% by mass to about 50% by mass. The usable solvents include water; alcohols such as methanol, ethanol, n-propanol, isopropanol, ethylene glycol, propylene glycol; terpenes such as α- or β-terpineol; ketones such as acetone, methyl ethyl ketone, cyclohexanone, N-methyl-2-pyrrolidone; aromatic hydrocarbons such as toluene, xylene, tetramethyl benzene; glycol ethers such as cellosolve, methyl cellosolve, ethyl cellosolve, carbitol, methyl carbitol, ethyl carbitol, butyl carbitol, propylene glycol monomethyl ether, propylene glycol monoethyl ether, dipropylene glycol monomethyl ether, dipropylene glycol monoethyl ether, triethylene glycol monomethyl ether, and triethylene glycol monoethyl ether; acetates such as ethyl acetate, butyl acetate, cellosolve acetate, ethyl cellosolve acetate, butyl cellosolve acetate, carbitol acetate, ethyl carbitol acetate, butyl carbitol acetate, propylene glycol monomethyl ether acetate, and propylene glycol monoethyl ether acetate. A mixture of one kind or 2 or more kinds of these solvents may be used.

In case of a film in the form of a solid, the orientation can be achieved by applying external force to a dye composition containing dyes.

For example, cited is a method in which dyes are dissolved in a solvent such as water and methanol, and the resulting coating solution of the dye composition, in which the dyes are dissolved, is applied to a substrate while applying external force via methods such as a wire bar coat, a gravure coat, and a die coat, and then the coated substrate is dried.

Specifically, the polarization control film can be obtained, for example, in such a manner that a coating composition, in which the above dye is dissolved into a solvent such as above, is coated using a wire bar to a concentration of about 3% by mass or more, and then the resulting coating is dried.

The polarization control film may be comprised only of a dye, or may have an embodiment incorporating other materials such as a binder.

Further, the polarization control film, in which dyes are oriented, can be obtained by forming a dye composition incorporating resins and dyes into the form of a film, and stretching the resulting film.

Further, the polarization control film, in which dyes are oriented, can be obtained in such a manner that a dye composition incorporating orientation materials and dyes is subjected to a treatment such as an electric field, a magnetic field, wind currents, liquid flow, an oblique vapor deposition, rubbing, a photo-alignment film, substrate irregularity, difference in wettability, shearing, or stretching.

As an embodiment of the orientation, an in-plane uniaxial orientation is preferred.

The in-plane uniaxial orientation means that dyes in the film have an optical axis or an absorption axis, which axis is parallel to a substrate surface to which a dye solution is applied, and the orientation can be formed in such a manner that a dye solution or a dye film is subjected to a treatment such as an electric field, a magnetic field, wind currents, liquid flow, an oblique vapor deposition, rubbing, a photo-alignment film, substrate irregularity, difference in wettability, shearing, or stretching.

(Polarization Control Element)

The polarization control element of the present invention comprises the above polarization control film and charge supply means.

The charge supply means is a means to supply charges to dyes in the polarization control film, and has preferably an electrolyte layer and an electrode.

The polarization properties of the polarization control film are changed due to receiving and releasing charge by dyes through an electrolyte layer.

The change of the polarization properties of the present invention is caused by a change of absorption coefficient of a dye itself due to receiving and releasing charge by the dye, and is not caused by a change of orientation of the dye.

Namely, the polarization control film of the present invention is a charge control type polarization control film in which the control of the polarization properties is carried out by receiving and releasing charge, and the polarization control element of the present invention is a charge control type polarization control element in which the control of the polarization properties is carried out by receiving and releasing charge.

In the present invention, a preferred embodiment is that the state of the polarization control film is reversibly controlled through receiving and releasing charge between a state in which dyes are in a colored state exhibiting polarization properties and a state in which dyes are in a non-colored state exhibiting no polarization property.

Namely, a preferred embodiment is that, when non-voltage being applied and when voltage being applied, the state is reversibly changed between a state in which dyes are in a colored state and a polarization control film exhibits polarization properties, and a state in which dyes are in a non-colored state and a polarization control film exhibits no polarization property.

In the polarization control element of the present invention, the dyes may be incorporated in an electrolyte layer, and in such a case, the polarization control film simultaneously becomes the electrolyte layer.

Figure 2:
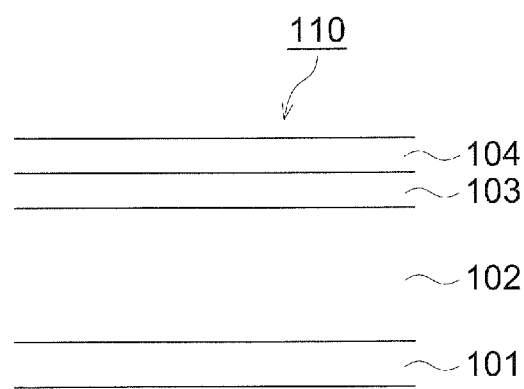
FIG. 2 is a schematic cross-sectional view of example of the polarization control element of the present invention.

A typical example of a constitution of the polarization control element of the present invention is shown in FIG. 2.

Polarization control element 110 has electrolyte layer 102 on first electrode 101, and has polarization control film 103 on the electrolyte layer 102, and further, has second electrode 104 on the polarization control film 103.

Charges can be supplied to dyes by applying voltage between the facing first electrode 101 and the second electrode 104.

(Constitution in which Charge Supply is Locally Controllable)

In the present invention, the polarization control element can be applied for image displaying or as a multifunctional plate such as an element locally having the mirror function by constituting it so that the charge supplied from the charge supplying means can be locally controlled.

The constitution in which the charge supply can be locally controlled can be obtained by a constitution including plural pixels having a pair of a charge supplying means and a polarization control film.

Here, the "pixel" is one having a pair of the charge supplying means capable of supplying charge independently from another pixel and the polarization control film. When the charge supplying means has an electrolyte layer and an electrode, the pixel has the electrolyte layer and the polarization control film placed between the pair of electrodes and a wiring by which the charge supplied to the electrodes can be controlled independently from another pixel.

As the system for driving the pixel, a static driving system in which voltage is applied to selected electrode, a matrix driving system in which electrodes are arranged in the longitudinal and latitudinal directions as to the pixels arranged in a grid form and voltage is applied to selected electrode so that voltage is applied to the pixel at which the both of the electrodes arranged in the longitudinal and latitudinal directions are selected, and an active driving system in which a thin-layer transistor (TFT) and an additive capacitance is connected to the pixel for controlling the pixel, are applicable.

As the shape of the electrode, stripe-shape, grid-shape and disc-shape are applicable.

Figure 3:
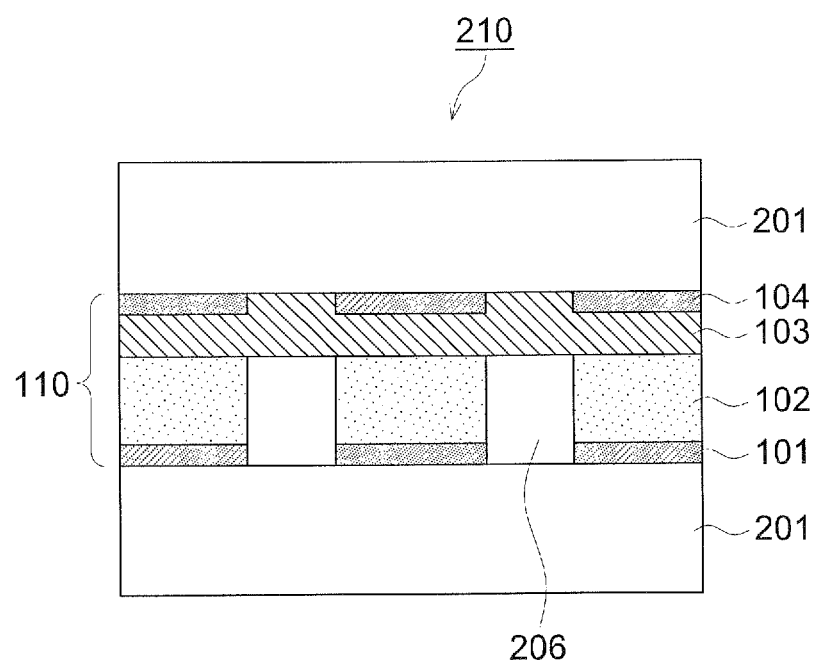
FIG. 3 is a schematic cross-sectional view of example of the polarization control element having a constitution capable of locally controlling the charge supply.

A cross-section view of a typical example of constitution of the polarization control element in which the charge supply can be locally controlled is shown in FIG. 3.

The constitution shown in FIG. 3 is an example of the polarization control element 210, in which charge supply can be locally controlled, has a polarization control 110 provided on a substrate 201. The polarization control element is constituted by the pixel which has a first electrode 101 provided on a substrate 202, an electrolyte layer 102 provided on the first electrode 101, a polarization control film 103 provided on the electrolyte layer 102, and a second electrode 104 provided on the polarization control film 103.

The first electrode 101 and the electrolyte layer 102 are separated from another pixel by an insulation layer 206.

The charge can be supplied to the dye by applying voltage between the first electrode 101 and the second electrode 104.

The insulation layer may be omitted when the electrolyte layer is made from a solid material which can hold the shape thereof by itself.

(Electrode)

The usable electrode includes, for example, a conductive film composed of a metal film or a metal oxide of metals such as gold, silver, chromium, copper, and tungsten. The electrode is preferably transparent depending on its use.

The above metal oxide includes, for example, ITO ($In_2O_3$—$Sn_2$), tin oxide, silver oxide, zinc oxide, and vanadium oxide.

The thickness of the electrode is, but is not particularly limited to, commonly 10 to 500 nm, and preferably in a range of 50 to 300 nm. The surface resistance (resistivity) thereof is, but is not particularly limited to, commonly preferably 500 $\Omega/cm^2$ or less, and particularly preferably in a range of 50 $\Omega/cm^2$ or less.

For the formation of the electrode, heretofore known means can optionally be adopted, but it is preferable to select means to be adopted depending on a kind of metal and/or metal oxide constituting the electrode.

Generally, methods such as a vacuum vapor deposition method, an ion plating method, a sputtering method, and a sol-gel method are employed.

An electrode activation material layer may be provided on the surface of an electrode, for the purposes such as providing the electrode with the oxidation-reduction ability, improving electric conductivity of the electrode, providing the electrode with an electric double layer capacity.

Usable electrode activation material includes, for example, metals such as cupper, silver, gold, platinum, iron, tungsten, titan, and lithium; organic compounds exhibiting the oxidation-reduction ability such as polyaniline, polythiophene, polypyrrole, and phthalocyanine; carbon materials such as activated carbon and graphite; metal oxides such as $WO_3$, $V_2O_5$, $MnO_2$, NiO, and $IR_2O_3$, or the mixture thereof.

When the electrode activation material layer is provided on the electrode, it is preferable that it should be carried out so as not to excessively degrade transparency of the electrode.

Therefore, employed, for example, is a method in which a composition composed of such as activated carbon fibers, graphite, or acryl resins is applied to a transparent ITO layer in the form of fine stripes or of dots, or a method in which a composition composed of such as $V_2O_5$, acetylene black, and butyl rubber is applied to a thin gold film in the form of a mesh.

The above-described electrode can be used for both first electrode and second electrode as shown in FIG. 1.

(Electrolyte Layer)

The electrolyte layer is located between the facing electrodes, and a layer exhibiting a function of charge transport between the both electrodes. Preferably used is a layer exhibiting the ion conductivity of $10^{-5}$ to $10^{-1}$ S/cm at room temperature.

The electrolyte layer is composed of an electrolyte composition.

The electrolyte composition incorporates an electrolyte material, and further it preferably incorporates a solvent.

The solvent includes a mixture of one kind or two or more kinds of cyclic carbonates such as propylene carbonate (PC), ethylene carbonate (EC), butylene carbonate (BC), and vinylene carbonate (VC); linear carbonates such as dimethyl carbonate (DMC), diethyl carbonate (DEC), ethyl methyl carbonate (EMC), and dipropyl carbonate (DPC); aliphatic carboxylic acid esters such as methyl formate, methyl acetate, ethyl propionate; γ-lactones such as γ-butyrolactone; linear ethers such as 1,2-diethoxyethane, and 1-ethoxy-1-methoxy-ethane; cyclic ethers such as tetrahydrofuran, and 2-methyl tetrahydrofuran; and aprotic organic solvents such as dimethyl sulfoxide, 1,3-dioxolane, formamide, acetamide, dimethylformamide, dioxolan, acetonitrile, propyl nitrile, nitromethane, ethyl monoglyme, phosphoric acid triesters, trimethoxymethane, dioxolan derivatives, sulfolane, methyl-sulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, and N-methyl-2-pyrrolidone.

As the electrolyte material, salts, acids, or alkalines may be used.

As the salts, usable are, for example, but are not particularly limited to, inorganic ionic salts such as alkali metal salts, and alkaline-earth metal salts; quaternary ammonium salts; cyclic quaternary ammonium salts; and quaternary phosphonium salts.

Preferable specific examples of the salts include alkali metal salts such as $LiClO_4$, LiSCN, $LiBF_4$, $LiAsF_6$, $LiCF_3SO_3$, $LiPF_6$, LiI, NaI, NaSCN, $NaCl_4$, $NaBF_4$, $NaAsF_6$, KSCN, and KCL; quaternary ammonium salts such as $(CH_3)_4NBF_4$, $(C_2H_5)_4NBF_4$, $(n-C_4H_9)_4NBF_4$, $(C_2H_5)_4NBr$, $(C_2H_5)_4NCl$, $(C_2H_5)_4NClO_4$, $(n-C_4H_9)_4NClO_4$, $CH_3(C_2H_5)_3NBF_4$, and $(CH_3)_2(C_2H_5)_2NBF_4$; and phosphonium salts such as $(CH_3)_4PBF_4$, $(C_2H_5)_4PBF_4$, $(C_3H_7)_4NBF_4$, and $(C_4H_9)_4NBF_4$, or mixtures thereof.

The acids are also not particularly limited, and usable are inorganic acids or organic acids, specifically a sulfuric acid, a hydrochloric acid, phosphoric acids, sulfonic acids, or carboxylic acids. The alkalis are also not particularly limited, and each of a sodium hydroxide, a potassium hydroxide, a lithium hydroxide, and the like is also usable. The amount of the supporting electrolyte to be used is optional including a case where it is not used However, the electrolyte material desirably presents in an ion conducting layer commonly in an amount, as its upper limit, of 20 M or less, preferably 10 M or less, more preferably 5 M or less, and as its lower limit, usually 0.01 M or more preferably 0.05 M or more, more preferably 0.1 M or more.

The form of the electrolyte composition can be in the form of liquid composed of above solvent incorporating above electrolyte material, or in the form of a gel or a solid as described below.

The form of a gel or a solid includes, for example, a gel or solid form which is formed in a manner that a solvent, in which the electrolyte material is dissolved, is put in a high-molecular material or an organic-inorganic complex substance comprising organic and inorganic substances, or a gel or solid form which is formed in a manner that a mixture incorporating a polymerizable monomer, a polymerization initiator and the electrolyte substance is polymerized.

The above high-molecular material includes vinylidene fluoride based polymers such as polyvinylidene fluoride, vinylidene fluoride-hexafluoropropylene copolymer, vinylidene fluoride-ethylene copolymer, vinylidene fluoride-monofluoroethylene copolymer, vinylidene fluoride-trifluoroethylene copolymer, vinylidene fluoride-tetrafluoroethylene copolymer, and vinylidene fluoride-hexafluoropropylene-tetrafluoroethylene three-component copolymer; acrylonitrile based polymers such as acrylonitrile-methyl methacrylate copolymer, acrylonitrile-methyl acrylate copolymer, acrylonitrile-ethyl methacrylate copolymer, acrylonitrile-ethyl acrylate copolymer, acrylonitrile-methacrylic acid copolymer, acrylonitrile-acrylic acid copolymer, and acrylonitrile-vinyl acetate copolymer; as well as polyethylene oxide, ethylene oxide-propylene oxide copolymer, and acrylate polymers and methacrylate polymers of these compounds.

The above organic-inorganic complex substance is a substance formed by physically mixing organic substance and inorganic substance or chemically binding between them. As the inorganic substance, inorganic oxide particulates are preferred.

Specific examples include silicon oxide, titanium oxide, zinc oxide, aluminum oxide, zirconium oxide, hafnium oxide, niobium oxide, tantalum oxide, magnesium oxide, calcium oxide, strontium oxide, barium oxide, indium oxide, lead oxide, scandium oxide, yttrium oxide, lanthanum trioxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide, lutetium oxide, iron oxide, zirconium oxide, clay, tin oxide, tungsten oxide, and aluminum phosphate.

The organic substance, other than the above high-molecular material, includes polyethylene oxide, and ethylene oxide-propylene oxide copolymer having an alkoxy silyl group, an alkoxy titanate group, an alkoxy aluminate group, or an alkoxy zirconate group, each of which can modify the surface of the above inorganic oxide particulates by a chemical bonding.

The above polymerizable monomer includes, for example, a monomer having an unsaturated double bond such as an acryloyl group, a methacryloyl group, a vinyl group, and an allyl group.

Examples thereof include acrylic acid, methyl acrylate, ethyl acrylate, ethoxy ethyl acrylate, methoxy ethyl acrylate, ethoxy ethoxy ethyl acrylate, polyethylene glycol monoacrylate, ethoxy ethyl methacrylate, methoxy ethyl methacrylate, ethoxy ethoxy ethyl methacrylate, polyethylene glycol monomethacrylate, N,N-diethyl amino ethyl acrylate, N,N-dimethyl amino ethyl acrylate, glycidyl acrylate, acryl acrylate, acrylonitrile, N-vinyl pyrrolidone, diethylene glycol diacrylate, triethylene glycol diacrylate, tetraethylene glycol diacrylate, polyethylene glycol diacrylate, diethylene glycol dimethacrylate, triethylene glycol dimethacrylate, tetraethylene glycol dimethacrylate, polyethylene glycol dimethacrylate, polyalkylene glycol diacrylate, polyalkylene glycol dimethacrylate, as well as trifunctional monomers such as trimethyloipropane alkoxylate triacrylate, and pentaerythritol alkoxylate triacrylate, and tetra- or more functional monomers such as pentaerythritol alkoxylate triacrylate, and di-trimethylolpropane alkoxylate tetraacrylate.

The above electrolyte composition having the above gel or solid form preferably exhibits thermal reversibility in which a substance becomes fluidized by heating and becomes non-fluidized at room temperature, or a thixotropic nature in which a substance becomes fluidized by a shearing force even at room temperature and becomes non-fluidized when it is kept stand still.

In case where dyes are incorporated in the electrolyte layer, preferably employed is an embodiment in which, using an electrolyte composition exhibiting the thixotropic nature, the dyes, which are fluidized by using a shearing force, are coated so that the dyes are oriented.

The non-fluoridation, in which polymerizable monomers are allowed to be a gel or solid form, is carried out by polymerizing the above monomers employing a means such as heat, ultra violet rays, and electron beams. In such a case, a polymerization initiator is preferably used so that the polymerization proceeds effectively.

The polymerization initiators include benzoin, benzyl, acetophenone, benzophenone, Michler's ketone, biacetyl, benzoylperoxide, as well as peroxyneodecanoates such as t-butyl peroxyneodecanoate, α-cumyl peroxyneodecanoate, t-hexyl peroxyneodecanoate, 1-cyclohexyl-1-methylethyl peroxyneodecanoate, and t-amyl peroxyneodecanoate; peroxyneoheptanoates such as t-butyl peroxyneoheptanoate, α-cumyl peroxyneoheptanoate, t-hexyl peroxyneoheptanoate, 1-cyclohexyl-1-methylethyl peroxyneoheptanoate, and t-amyl peroxyheptanoate.

As the polymerizable monomer, other than the above monomers, usable are monomers which form a polymer which is formed by a polycondensation of polyester, polyamide, polycarbonate, polyimide, and the like, or by a polyaddition of polyurethane, polyurea, and the like.

The electrolyte layer preferably incorporates the electrolyte composition and a separator. As the separator, usable are a porous material formed with insulated plastics comprising such as polyethylene, polypropylene, and polyimide, or inorganic particulates, such as silica.

(Substrate)

The polarization control element of the present invention is preferably formed on a substrate, and is employed together with the substrate.

The substrate is a member capable of carrying a polarization control film, an electrolyte layer, and an electrode, and its material, shape, structure, thickness, and the like may be optionally selected from commonly known ones.

The substrate includes, for example, polyester based resin films such as a polyethylene terephthalate (PET), a polyethylene naphthalate (PEN), and modified polyesters; polyolefin based resin films such as polyethylene (PE) resin films, polypropylene (PP) resin films, polystyrene resin films, cyclic olefin based resins; polyether ether ketone (PEEK) resin films, polysulfone (PSF) resin films, polyether sulfone (PES) resin films, polycarbonate (PC) resin films, polyamide resin films, polyimide resin films, acryl resin films, triacetate cellulose (TAC) resin films. Any resin films are preferably employed for the transparent resin film of the present invention, as long as it exhibits transmittance of light at a wavelength of visible region (380 to 780 nm) of 80% or more. Of these, in view of transparency, thermal resistance, easy handling, strength and cost, preferred are a biaxial drawing polyethylene terephthalate film, a biaxial drawing polyethylene naphthalate film, a polyether sulfone film, a polycarbonate film, and more preferred are a biaxial drawing polyethylene terephthalate film, and a biaxial drawing polyethylene naphthalate film.

The substrate may be subjected to a surface treatment or provided with an easy adhesion layer in order to secure wettability or adhesiveness of a coating solution to form an electrolyte layer or a polarization control film.

Regarding the surface treatment or the easy adhesion layer, heretofore known technologies may be employed.

The surface treatment includes, for example, surface activation treatments such as corona discharge treatment, flame treatment, ultraviolet treatment, high frequency treatment, glow discharge treatment, active plasma treatment, and laser treatment. Substances employed for the easy adhesion layer includes polyester, polyamide, polyurethane, vinyl based copolymers, butadiene based copolymers, acryl based copolymers, vinylidene based copolymers, and epoxy based copolymers.

In case where the transparent film is composed of the biaxial drawing polyethylene terephthalate film, it is more preferable that, by setting a refractive index of the easy adhesion layer adjacent to a film to 1.57 to 1.63, interface reflection can be decreased to result in enhancement of the transmittance.

The adjustment of the refractive index can be achieved by suitably controlling a ratio between oxide sol, such as tin oxide sol and cerium oxide sol, having a relatively high refractive index, and binder resins, and by coating the mixture.

The easy adhesion layer may be a single one, or take a constitution having layers of 2 or more to improve adhesiveness.

Application of the polarization control element of the present invention includes a display device, a lighting device, polarization eyeglasses, and a privacy film.

Above-described dyes, polarization control film, and charge supply means are used in the polarization control method of the present invention in which, by using a polarization control film incorporating oriented dichroic dyes in which absorption wavelength of the molecule is changed by receiving and releasing charge and a polarization control element having a charge supply means, charges are supplied from the aforesaid charge supply means to the aforesaid dichroic dyes to change polarization properties of the aforesaid polarization control film.

(Multi-layer Polarization Control Element)

The multi-layer polarization control element of the present invention has plural layers each constituted by the polarization control element of the present invention, and the orientation directions of the dichroic dye incorporated in the polarization control film of the polarization control element of each of the plural layers are different from each other.

Namely, plural layers of the polarization control element are laminated in the multi-layer polarization control element of the present invention so that the orientation directions of the dichroic dye in each of the polarization control element layers are different from each other.

It is necessary that each or the laminated polarization control elements are insulated from each other and the control elements are preferably laminated through an insulation layer.

As the material to be used for the insulating layer, the materials used for the foregoing substrate can be used. Among them, polyimide, bi-axially stretched poly(ethylene phthalate), bi-axially stretched poly(ethylene naphthalate), and triacetyl cellulose are preferably used.

The thickness of the insulation layer is preferably from 50 nm to 200 nm.

The methods for laminating the polarization control elements and the insulation layers to prepare the multi-layer polymerization control element include, for example, a method in which adherent is coated on both sides of the insulation layer and the polarization control elements are pasted on the both sides of the insulation layer, and a method in which electrodes are formed on both sides of the insulation layer by a method such as vapor deposition and the polarization control elements are constituted by using thus formed electrodes.

For example, plural functions can be provided to light emission element by controlling the polarization properties of plural polarization control elements since the orientation directions of the dye in each of the plural polarization control element are different from each other.

For instance, when two of the polarization control elements in each of which the orientation direction is different by 90° are used, a black image can be displayed and functions of black image display, dazzling prevention, 3D display, 2D display, usual display and mirror can be easily changed for utilizing.

Figure 4:
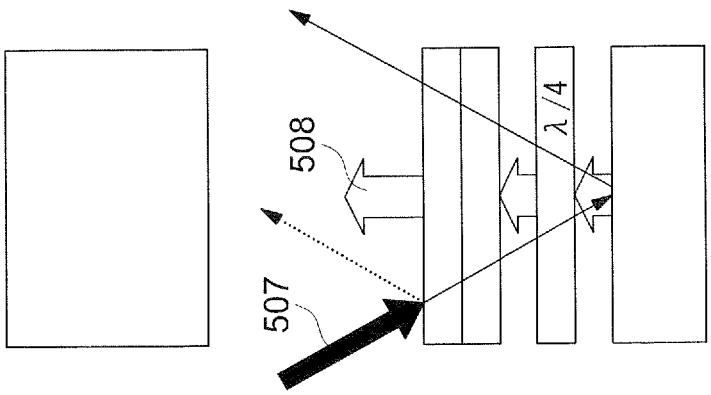
FIGS. 4.1 to 4.3 are schematic cross-sectional views of example of the light emission element having the multi-layer polarization control element of the present invention.

The schematic cross-section view of an example of the light emission element having the polarization control element of the present invention is shown in FIGS. 4.1 to 4.3.

In the example shown in FIGS. 4.1 to 4.3, the multi-layer polarization control element is constituted by lamination of two polarization control element layers.

In FIGS. 4.1 to 4.3, the polarization control element 502, which is the same as the polarization control element 501, is laminated on the polarization element 501 through the insulation layer, not shown in the drawing, so that the orientation directions of the dye in each of the elements are different by 90° to constitute the multi-layer polarization control element 503. The later-mentioned λ/4 retardation plate 506 is laminated between the light emission element 504 and the multi-layer polarization control element 503.

In the state of (1), any voltage is not applied to both of the polarization control elements 501 and 502, and incident light 507 and emitted light 505 are blocked so that black image can be displayed.

In the state of (2), voltage is applied only to the polarization control element 502 for removing the polarization ability so that the external light reflection preventing function is caused by the later-mentioned ellipse polarization plate constituted by the polarization control element 501 and the λ/4 retardation plate 506.

In the state of (3), voltage is applied to both of the polarization control elements 501 and 502 for removing the polarization ability of them so that the emitted light is output as light 508 for usual display without lowering of the emitted light when the external light reflection preventing function is not necessary. Moreover, the light emission element 504 reflects external light 507 and functions as a mirror when the light emission element does not emit light.

Furthermore, the multi-layer polarization control element capable of switching the functions of it such as black image display, 3D display, 2D display or usual display can be prepared by laminating a first polarization control element having plural stripe-shaped polarization control elements and a second polarization control element the same as the first element except that the orientation direction of dye is different by 90° so as to make the direction of the stripe is the same.

The difference of the angle of the orientation direction is preferably 90° from the viewpoint of switching of the functions.

In the multi-layer polarization control element, the polarization control element to be laminated may be two layers as above-mentioned or three or more layers.

A multi-layer polarization control element constituted by laminating six layers of polarization control elements each different by 30° in the orientation direction of dye can perform switching function to six polarized lights each different in the angle of polarization axis by 30°.

(Ellipse Polarization Plate)

The ellipse polarization plate of the present invention contains the retardation plate, the above-specified polarization control film and the charge supplying means.

The ellipse polarization plate is constituted by laminating the retardation plate, polarization control element.

Figure 5:
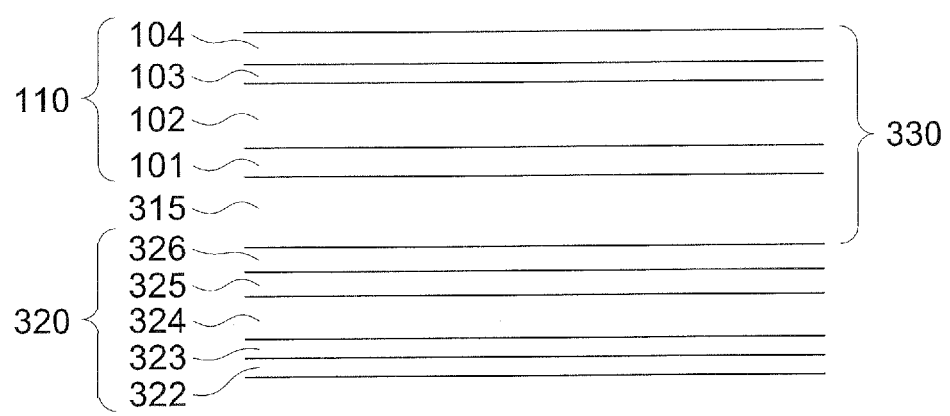
FIG. 5 is a schematic cross-sectional view of example of the light emission element having the ellipse polarization plate of the present invention.

FIG. 5 is a schematic cross-section view of an example of the light emission element having the ellipse polarization plate. In the light emission element 304, the ellipse polarization plate 330 and the later-mentioned light emission material are laminated.

The ellipse polarization plate 330 is constituted by laminating the retardation plate 315 and polarization control element 110.

The polarization control element 110 has the electrolyte layer 102 provided on the first electrode 101, the polarization control film 103 provided on the electrolyte layer 102, and the second electrode 104 provided on the polarization control film 103.

The retardation plate 315 and the polarization element 110 are laminated through the adherent layer (not displayed in the drawing).

Charge can be supplied to the dye by applying voltage between the first electrode 101 and the second electrode 104 which are faced to each other.

(Retardation Plate)

The retardation plate relating to the present invention is a plate having double refraction function causing retardation between the polarized light components crossing with right angles.

The retardation plate includes one causing a phase difference of $\pi/2$ (90°, which is called as a $\lambda/4$ or quarter-wavelength plate and used for converting linear polarized light to circular (ellipse) polarized light or circular (ellipse) polarized light to linear polarized light, and one causing a phase difference of $\pi$ (180° which is called as a $\lambda/2$ plate or half-wavelength plate and used for changing the polarization direction of the linear polarized light.

The retardation plate may be single plate of the half-wavelength plate or the quarter-wavelength plate, a laminated plate of both of them, or one having a liquid crystal layer for causing phase difference on the substrate.

The following films can be suitably used as the retardation film.

Examples of such the film include cellulose ester type film, polyester type film, polycarbonate type film, polysulfone (including polyethersulfone) type film, polyester film such as poly(ethylene terephthalate) and poly(ethylene naphthalate), polyethylene film, polypropylene film, cellophane, cellulose diacetate film, cellulose acetate-butylate film, poly(vinylidene chloride) film, poly(vinyl alcohol) film, ethylenevinyl alcohol film, syndiotactic polystyrene type film, polycarbonate film, norbornane resin type film, polymethylpentene film, polyetherketone film, polyetherketone imide film, polyamide film, fluororesin film, nylon film, cycloolefin polymer film, poly(methyl methacrylate) film, and acryl film. However, the film is not limited to the above-mentioned.

These films can be obtained by a solution-casting method or melt-casting method. For example, the retardation plates described in Japanese Patent Application Publication Nos. 2008-242464, 2007-108529 and 2006-284703 are usable.

Among the above-mentioned, cellulose ester film, polycarbonate film, polysulfone (including polyethersulfone) film and cycloolefin polymer film are preferable, and cellulose ester film containing cellulose ester as the principal ingredient is preferable from the view point of production, cost, transparency, uniformity and adhesive property.

The thickness of the retardation plate is preferably approximately from 20 μm to 100 μm depending on the use.

Lamination of the retardation plate and the polarization control element can be carried out by a method in which the electrode of polymerization control element is formed on the retardation plate used as the substrate and then the polymerization control element is successively constituted, or a method in which the retardation film is laminated on the polarization control element through adherent or binder.

Particularly, the former method using the retardation plate as the substrate is preferable.

(Light Emission Element)

The ellipse polarization plate of the invention can be suitably used as the light emission element. The light emission element of the present invention is a light emission element having the ellipse polarization plate of the present invention and a light emission member, and the light emission member has a light emission layer.

The light emission element of the invention includes a displaying element and a lighting element.

When the ellipse polarization plate is used as the displaying element, one apparatus having the displaying function excellent in the visual properties and the stability of display and further having other multifunction such as a mirror function can be provided.

When the ellipse polarization plate is used as the lighting apparatus, an apparatus having excellent lighting properties and further having a function such as the mirror function can be also provided.

As the light emission layer, inorganic or organic light emission layer can be used, and an element using the organic light emission layer is preferably used in the present invention.

As the embodiment of element having the organic light emission layer, an organic electroluminescent element, hereinafter referred to as organic EL element, is particularly preferred.

The light emission element of the present invention is described referring the organic EL element as an example.

(Organic EL Element)

The light emission member is a structure including a first electrode provided on a substrate, an organic layer containing an organic light emission layer provided on the first electrode and a second electrode provided on the organic layer.

In the example shown in FIG. 5, the light emission member 320 is constituted by forming the first electrode 325, the organic layer 324 containing the organic light emission layer, and the second electrode 323 on (bottom side in the drawing) the substrate 326, and further a sealing layer 322 is laminated on the surface of the light emission member through a adherent layer (not shown in the drawing).

A part of each of the first electrode 325 and the second electrode 323 is exposed for making possible to pass electronic current (not shown in the drawing) and electric current is supplied through them to emit light from the organic light emission layer in the organic layer 324.

The substrate is a planar (sheet) material capable of carrying the organic layer containing the light emission layer. As examples of the substrate, poly(ethylene phthalate) (PET), poly(ethylene naphthalate) (PEN), Polyethersulfone (PES), polyetherimide, poly(ether ether ketone), polyphenylenesulfide, polyallylate, polyimide, polycarbonate (PC), cellulose triacetate (TAC), and Cellulose acetate propionate can be cited.

The thickness of the substrate is preferably from 10 μm to 1 mm, and more preferably from 50 to 300 μm.

When the transparent resin film is used as the substrate, a gas barrier layer may be formed on the surface, of the resin film according to necessity. As the gas barrier layer, a layer of an inorganic or organic substance, or a hybrid layer of them are cited. As the property of the gas barrier layer, a steam permeability of not more than 0.01 $g/m^2 \cdot day \cdot atm$ is preferable. Moreover, a high barrier film having an oxygen permeability of not more than $10^{-3}$ $ml/m^2 \cdot day \cdot atm$ and a steam permeability of not more than $10^{-5}$ $g/m^2$ day·atm is more preferably.

The first electrode 325 is an anode which is preferably composed of a electro-conductive material having a work function of not less than 4 eV and a transparency of not less than 40% such as indium tin oxide (ITO), indium zinc oxide (IZO), gold, tin oxide and zinc oxide, when the electrode is made transparent.

The organic light emission layer is a layer containing an light emission organic compound.

Examples of the organic light emission material include an aromatic heterocyclic compound such as carbazole, carboline and diazacarbazole, a triarylamine derivative, a stilbene derivative, polyarylene, an aromatic condensed polycyclic compound, an aromatic condensed heterocyclic compound, a metal complex compound, a homo-oligomer and a composite oligomer of them but the material is not limited to the above-mentioned.

The organic light emission material in the organic light emission layer preferably contains a dopant in an amount of approximately from 0.1 to 20% by weight.

As the dopant, known fluorescent dyes such as a perylene derivative and a pyrene derivative are usable. When the light emission layer is a phosphorescent type, a complex type compound typified by tris(2-phenylpyridine) iridium, bis(2-phenylpyridine)(acetylacetonate) iridium, and bis(2,4-dofluorophenylpyridine) (picolinate)iridium is cited.

The thickness of light emission layer is preferably from 0.5 to 500 nm, and particularly preferably from 0.5 to 200 nm.

The thickness of the organic light emission layer is preferably from several nanometers to several micrometers.

The second electrode 323 is a cathode and preferably an electrode composed of a metal material having a work function of less than 4 eV and a reflectance of not less than 60% such as aluminum, sodium, lithium, magnesium, silver and calcium is preferable when the electrode is used as a reflection electrode.

The organic EL element is an element which emits light utilizing the excitation energy generated by combination or an electron and positive hole in the organic light emission layer generated by the electric current externally supplied through the first electrode (anode) 325 and the second electrode (cathode) 323.

Light emitted from the organic light emission layer of the light emission member 320 is permeated through the first electrode 325 and the substrate 326 and taken out through the ellipse polarization plate. However, a constitution so called as top-emission may be applicable, in which the second electrode (cathode) is formed by laminating a thin layer of the cathode material and the anode material having high transparency so as to make the electrode to substantially transparent, and light is taken out through the cathode. In such the case, the ellipse polarization plate is provided on the reverse side to that shown in FIG. 5.

A positive hole transfer layer and a positive hole injection are preferably provided between the first electrode 325 and the organic light emission layer, and an electron transfer layer and an electron injection layer are preferably provided between the second electrode 323 and the organic light emission layer.

As the positive hole injection or transfer layer, a polymer material such as an electro-conductive polymer typified by a phthalocyanine derivative, heterocyclic azoles, aromatic tertiary amines and polyvinylcarbazole and polyethylenedioxythiophene/polystyrenesulfonic acid (PEPOT:PSS), and a material used in the light emission layer, for example, a carbazole type light emission material such as 4,4'-dicarbazolyldiphenylbenzene, a low molecular weight light-emission typified by (di)azacarbazoles and a pyrene type light emission material such as 1,3,5-tripyrenylbenzene, and a polymer light emission material typified by polyphenylenevinylenes, polyolefins and polyvinylcarbazoles, are cited.

As the electron injection and transfer material, a metal complex compound such as lithium 8-hydroxyquinolinate and zinc bis(8-hydroxyquinolinate), and the following nitrogen-containing five-member cyclic derivative are usable. Namely, oxazole, thiazole, oxadiazole, thiadiazole and a triazole derivative are preferred. Concretely, 2,5-bis(1-phenyl)-1,3,4-oxazole, 2,5-bis(1-phenyl)-1,3,4-thiazole, 2,5-bis(1-phenyl)-1,3,4-oxadiazole, 2-(4'-tert-butylphenyl)-5-(4"-biphenyl)-1,3,4-oxadiazole,2,5-bis(1-naphthyl)-1,3,4-oxadiazole,1,4-bis[2-(5-phenyloxadiazolyl)]benzene, 1,4-bis[2-(5-phenyloxydiazolyl)-4-tert-butylenzene],2-(4'-tert-butylphenyl)-5-(4"-biphenyl)-1,3,4-thiadiazole,2,5-bis(1-naphthyl)-1,3,4-thiadiaazole, 1,4-bis[2-(5-phenylthiadiazolyl)benzene, 2-(4'-tert-butylphenyl)-5-(4"-biphenyl)-1,3,4-triazole, 2,5-bis(1-naphthyl)-1,3,4-triazole and 1,4-bis[2-(5-phenyltriazolyl)]benzene are cited.

The thickness of each of the organic layers in the organic EL layer is necessarily approximately from 0.05 to 3 μm, and preferably approximately from 0.1 to 0.2 μm.

The sealing layer is a layer capable of reducing the influence of external atmosphere and is composed of a sealing material, which is a layer of an organic substance such as resin or an inorganic substance such as a nitride compound.

Examples of the resin usable for the sealing layer include ethylenetetrafluoroethyl copolymer (FTFE), high density polyethylene (HDPE), stretched polypropylene (OPP), polystyrene (PS), poly(methyl methacrylate(PMMA), stretched nylon (ONy), poly(ethylene terephthalate) (PET), polycarbonate (PC), polyimide, polyetherstyrene (PES) and poly (ethylene naphthalate) (PEN).

The sealing layer may be composed of plural layers, and a constitution having a barrier layer is particularly preferred.

The light emission element such as the organic EL element can be produced by known methods such as those described in Japanese Patent Application Publications Nos. 2008-79241 and 2008-305613, for example.

As utilization embodiments of the light emission element using the ellipse polarization plate of the present invention, displaying apparatus, lighting apparatus and privacy film are cited.

The above-described retardation plates, dyes, polarization control films and charge supplying means are used in the polarization property controlling method of the present invention in which the retardation plate, the ellipse polarization plate having the polarization control film containing the oriented dichroic dye capable of being reversibly changed in the molecular absorption spectrum and the charge supplying means, are used and the polarization property of the ellipse polarization plate is controlled by reversibly varying the polarization property of the polarization control film by controlling the supply of charge from the charge supplying means to the dichroic dye.

EXAMPLES

The invention is concretely described bellow referring examples. In the examples, "part" and "%" are each "part by weight" and "percent by weight", respectively, unless any specific description is not attached.

Example 1-1

(Synthesis of Exemplified Compound 1)

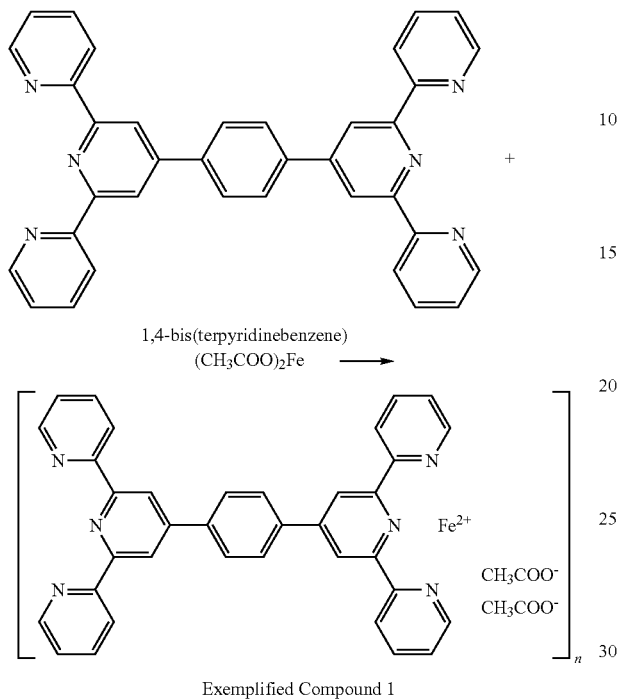

Exemplified Compound 1

Into a vessel of 300 ml, 72 ml of acetic acid, 7.20 g of 4-bis(terpyridine benzene) as the ligand and 2.32 g of iron acetate as the metal salt were added. The mixture was heated and refluxed for 6 hours.

After completion of the reaction, acetic acid was concentrated under vacuum, and thus obtained residue was dissolved in 60 ml of methanol. The solution was gradually dropped into 1 liter of toluene while stirring. As a result of that, purple crystals were precipitated. After that, the obtained solids was filtered and washed by toluene and dried. Thus 9.50 g of Exemplified Compound 1 was obtained with a yield of 100%. The molecular weight of the obtained Exemplified Compound 1 was confirmed by GPC (gel permeation chromatography). The number average molecular weight (Mn) and the weight average molecular weight (Mw) at a concentration of 0.1% by were each 2,900 and 6,300, respectively, and it was confirmed that the compound was in the form of polymer.

The obtained Exemplified Compound 1 displayed bluish purple (indigo) color when the compound was dissolved in water in a concentration of 1% by weight and visually observed.

Example 1-2

(Synthesis of Exemplified Compound 2)

Exemplified Compound 2 was synthesized in the same manner as in Example 1-1 except that 3.32 g of cobalt acetate tetrahydrate was used as the metal salt. The amount of the obtained compound was 9.40 g and the yield was 98%. The molecular weight of the obtained Exemplified Compound 2 was confirmed by GPC (gel permeation chromatography). The number average molecular weight (Mn) and the weight average molecular weight (Mw) at a concentration of 0.1% by were each 4,800 and 27,000, respectively, and it was confirmed that the compound was in the form of polymer.

The obtained Exemplified Compound 2 displayed yellowish orange color when the compound was dissolved in water in a concentration of 1% by weight and visually observed.

Example 2-3

(Synthesis of Exemplified Compound 3)

Exemplified Compound 3 was synthesized in the same manner as in Example 1-1 except that 6.45 g of dichlorotetrakis(dimethylsulfoxide) ruthenium (II) was used as the metal salt. The amount of the obtained compound was 10.0 g and the yield was 99%. The molecular weight of the obtained Exemplified Compound 3 was confirmed by GPC (gel permeation chromatography). The number average molecular weight (Mn) and the weight average molecular weight (Mw) at a concentration of 0.1% by were each 3,500 and 13,000, respectively, and it was confirmed that the compound was in the form of polymer.

The obtained Exemplified Compound 3 displayed vermilion color when the compound was dissolved in water in a concentration of 1% by weight and visually observed.

As described in Examples 1 to 3, Co, Ru and Fe each absorb light of the blue region, green region and red region, respectively. Therefore, neutral color can be formed by mixing them.

Example 2-4

Coordination polymer displaying gray color can be prepared in one-pot by simultaneously adding iron acetate, cobalt acetate tetrahydrate and dichlorotetrakis-(dimethylsulfoxide)ruthenium(II) to 1,4-bis(terpyridine-benzene). Example of such the preparation is described below.

Into a vessel of 300 ml, 72 ml of acetic acid, 7.20 g of 4-bis(terpyridine benzene) as the ligand and 0.26 g of iron acetate, 2.77 g of cobalt acetate tetrahydrate and 0.33 g of dichlorotetrakis-(dimethylsulfoxide)ruthenium(II) as the metal salt were added. The mixture was heated and refluxed for 6 hours.

After completion of the reaction, acetic acid was concentrated under vacuum, and thus obtained residue was dissolved in 60 ml of methanol. The solution was gradually dropped into 1 liter of toluene while stirring. As a result of that, 9.50 g blackish gray solid was obtained with a yield of 100%. The molecular weight of the obtained solid substance was confirmed by GPC (gel permeation chromatography). The number average molecular weight and the weight average molecular weight (Mw) at a concentration of 0.1% by were each 4,100 and 22,000, respectively, and it was confirmed that the compound was in the form of polymer.

The obtained solid substance displayed gray color when that was dissolved in water in a concentration of 1% by weight and visually observed.

Example 5

In 95 parts of water, 5 parts of the coordination polymer, Exemplified Compound 1, obtained in Example 1-1 was dissolved by stirring to obtain an aqueous solution of the coordination polymer. Thus obtained solution was coated on cellulose ester film KC4UE, manufactured by Konica Minolta Opt Inc., by an applicator having a gap of 30 μm, manufactured by Imoto Machinery Co., Ltd., and naturally dried to obtain an anisotropic dye layer. The dichroic ratio at 600 nm of thus obtained anisotropic dye layer was 26.

The dichroic ratio was determined as follows. Dichroic ratio D was determined by that the transmittance of the anisotropic layer was measured by a spectral photometer (Multi Chanel Photo Detector MCPD 2000 manufactured by Otsuka Electronic Co., Ltd.) in which an iodine type polarization element was inserted in the incidental light pass, and then the ratio was calculated by the following expressions.

Dichroic ratio $D=Az/Ay$
$Az=-\log (Tz)$
$Ay=-\log (Ty)$
Tz: Transmittance of light polarized in the absorbing axis direction of the dye layer
Ty: Transmittance of light polarized in the polarizing axis direction of the dye layer Example 6

In 95 parts of water, 5 parts of the coordination polymer, Exemplified Compound 4, obtained in Example 1-1 was dissolved by stirring to obtain an aqueous solution of the coordination polymer.

Thus obtained solution was coated on cellulose ester film KC4UE in the same manner as in Example 1-1 and naturally dried to obtain an anisotropic dye layer. The dichroic ratio at 600 nm of thus obtained anisotropic dye layer was 25.

Comparative Example 1-1

A dye composition was prepared by dissolving 5 parts of the following dye (Exemplified Dye 11-3 described in Patent Document 3) in 95 parts of water.

The obtained dye composition was coated on KC4UE and naturally dried in the same manner as in Example 6 to obtain an anisotropic dye layer. The dichroic ratio at 600 nm of thus obtained anisotropic dye layer was 8.

Comparative Example 1-2

Polyvinyl alcohol) film with a thickness of 120 µm was immersed in an aqueous solution containing 1 part by weight of iodine, 2 parts by weight of potassium iodide and 4 parts by weight of boric acid and stretched by 4 times at 50° C. to prepare an anisotropic dye layer. On both sides of the anisotropic dye layer, the alkali saponified surface of cellulose ester film KC4UY, manufactured by Konica Minolta Opt Inc., was pasted by using a 5% aqueous solution of completely saponified poly(vinyl alcohol) as adherent to prepare an anisotropic dye layer on which a protection film was provided. The dichroic ratio of the above obtained anisotropic dye layer measured by the foregoing method was 27.

(Alkali Saponification Treatment)
Saponification Process: 2 mol/L NaOH, 60° C., 60 sec.
Washing Process: Water, 30° C., 45 sec.
Neutralizing Process: 10 weight-% HCl, 30° C., 45 sec.
Washing Process: Water, 30° C., 45 sec.

After saponification treatment, the washing, neutralizing, washing processes were successively carried out and the dried at 80° C.

Example 7

The anisotropic dye layers of Examples 5 and 6 and Comparative Examples 1 and 2 were each kept for 20 hours at 150° C., and the dichroic ratio of them were re-determined to evaluate the durability.

The results are listed in Table 1-1.

TABLE 1-1

| Anisotropic dye layer | Dichroic ratio before durability test | Dichroic ratio after durability test |
|---|---|---|
| Example 5 | 26 | 24 |
| Example 6 | 25 | 24 |
| Comparative Example 1-1 | 8 | 5 |
| Comparative Example 1-2 | 27 | Cannot be determined |

In the anisotropic dye layer of Comparative Example 1-2, curling, cracking and breaking were caused after durability test and the form of the layer was destroyed, therefore, the dichroic ratio of which could not be determined. Moreover, the tone of the anisotropic dye layer of Comparative Example 1-2 was varied from neutral gray to brown and it was understood that the stability of dye was inferior.

It is understood from Table 1-1 that the anisotropic dye layer containing the coordination polymer of the invention

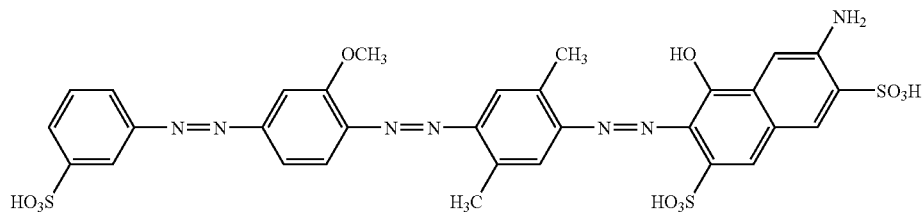 [SMILES: COc1cc(N=Nc2cccc(S(=O)(=O)O)c2)ccc1N=Nc1cc(C)c(N=Nc2c(S(=O)(=O)O)cc3cc(S(=O)(=O)O)c(N)cc3c2O)cc1C]

has high dichroic ratio and good durability by comparison as to the dichroism of Examples 5 and 6 to Comparative Example 1-1 and that as to the durability of Examples 5 and 6 to Comparative Examples 1 and 2.

Example 2-1

(Preparation of Coating Solution)
Coating Solution 11 (Example)
Five parts of the coordination polymer Exemplified Compound 1 obtained in the Example 1 (compound 1) are dissolved in 95 parts of water with mixing, to prepare an aqueous solution of the coordination polymer. The resulting aqueous solution was kept stand still for one day to prepare coating solution 11.

Coating Solution 12 (Example)
Coating solution 12 was prepared in the same manner as in Example 2-1 except that the quantities of compound 1 and water were changed to 3 parts and 97 parts respectively.

Coating Solution 13 (Comparative Example)
In order to prepare a solution described in the paragraph (0081) of the specification of Japanese Patent Application No. 2007-112957, 2 parts of a compound prepared in Example 1 described in the paragraph (0080) of the same Patent Application were dissolved in 1,000 parts of methanol with mixing. The resulting solution was kept stand still for one day to prepare coating solution 3.

(Determination of Orientation)

Coating solution 11 was dropped onto a glass substrate, which was then coated using an applicator of 30 μm (produced by Imoto Machinery Co. Ltd.). After that it was naturally dried for 10 minutes to produce a glass substrate having a dye layer.

Coating solutions 12, 13, and 14 were similarly processed to produce each of glass substrates having a dye layer.

In order to determine an orientation of these glass substrates having a dye layer, the degree of polarization was measured using a polarizing film analyzer VAP-7070D (produced by JASCO Corp.) and evaluated according to grades described below.

A: The degree of polarization is less than 50.
B: The degree of polarization is 50 or more and less than 90.
C: The degree of polarization is 90 or more.
Coating solution 1: A
Coating solution 2: B
Coating solution 3: C (Production of Polarization Control Elements 11 to 13)

Coating solution 1 was applied onto a quartz substrate on which an ITO electrode was vapor deposited (ITO portion being 1 $cm^2$) using a wire bar with a gap of 30 μm (produced by Imoto Machinery Co. Ltd.), which was then naturally dried for 10 minutes to prepare a quartz electrode having a dye layer. A 100 μm PET film as a spacer was sandwiched between the above quartz electrode having a dye layer and another quartz substrate on which an ITO electrode was vapor deposited (ITO portion being 1 $cm^2$). A solution, in which tetrabutyl ammonium bromide perchlorate was dissolved in propylene carbonate to 0.1 M, was charged into the gap formed by the PET film, to prepare polarization control element 11.

Coating solutions 12 and 13 were similarly processed to the above, to prepare polarization control elements 12 and 13 respectively.

(Determination of Change of Polarization Properties)

The degrees of polarization of polarization control element 1 were determined during non-application of voltage and during application of voltage of 6 V. Multi-function generator AD-8624A (A&D Co., Ltd.) was used for application of voltage. Polarizing film analyzer VAP-7070D (produced by JASCO Corp.) was used for the determination of the degree of polarization.

The ratio of remaining degree of polarization was calculated from the determined degree of polarization using a formula below.

Ratio (%) of the remaining degree of polarization during non-colored state against the initial degree of polarization= (1−(degree of polarization during non-application of voltage−degree of polarization during application of voltage)/degree of polarization during non-application of voltage)×100

For each of samples, the ratio of remaining degree of polarization during non-colored state against the initial degree of polarization was 0%.

As a result of alternate application of voltage 0 and 4V, the colored state and the non-colored state were can be repeatedly obtained.

(Production of Polarization Control Element 14 (Comparative Example (Guest-Host Liquid Crystal))

A liquid crystal material, in which a methyl red (produced by Aldrich Co.) was added by 1% by weight into 4'-heptyloxy-4-biphenyl carbonitrile (produced by Aldrich Co.), was charged into a glass cell with an ITO electrode for a liquid crystal with a gap of 5 μm (produced by Aldrich Co.) which was processed for use of homogeneous orientation. The resulting liquid crystal cell was heated to a temperature exhibiting an isotropy, and then it was gradually cooled down to 25° C. at a rate of 1° C/min. to produce polarization control element 14.

(Evaluation of Stability of Controlling Polarization Properties and Visual Feature)

A stability of controlling polarization properties and a visual feature of polarization control elements 11 to 14 were evaluated. The ratio of change of the degree of polarization was determined under conditions 1 to 4 described below, and the stability of controlling polarization properties was evaluated. In addition, the visual feature was evaluated with condition 5 described below.

The evaluation items are as follows:
1. Stability by irradiation of ultraviolet rays (1.0 mW/$cm^2$)
2. Stability by irradiation of visual light (25,000 Lx)
3. Stability by irradiation of sun light on clear day
4. Stability by heat at 50° C. for 60 min.
5. Evaluation of a visual feature (a determination of a ratio of change of transmittance)

(Measuring Apparatuses Used)

The SX-UI250HQ (produced by Ushio Inc.) was used as an ultraviolet light source. Evaluation samples were irradiated by ultraviolet light at 365 nm from directly above them so that the intensity became 1.0 mW/$cm^2$.

The high-intensity light box PHC-4 (produced by Pony Industry Co., Ltd.) was used as a visible light source. Evaluation samples were arranged with a space between each sample and the light box so that the illuminance on the sample becomes 25,000 Lx so that heat from the light box did not directly affect the evaluation samples.

Evaluation samples were irradiated by sunlight for 10 minutes on clear day.

The FP82HT/84HT microscope hot stage (produced by Mettler Toledo Inc.) was used for heat treatment.

The degree of polarization of the evaluation sample was determined within 30 seconds using a polarizing film analyzer VAP-7070D (produced by JASCO Corp.) after each treatment of above evaluation items 1 to 4.

(Evaluation of Stability of Controlling Polarization Properties)

A rate of change of the degree of polarization was calculated using a formula below from an amount of the change between that of before treatment of the evaluation item and that of after the treatment.

The rate of change of a degree of polarization=(degree of polarization before treatment−degree of polarization after treatment)×100/degree of polarization before treatment)

The rate of change of a degree of polarization thus obtained was evaluated according to grades described below, and the grade was used as an index of the stability of the controlling polarization properties.

A: 0 to less than 10%: a range for practical uses
B: 10% or more to less than 50%: a range insufficient for practical uses
C: 50% or more: an extremely unstable range (Evaluation of Visual Feature)

The transmittance was determined using a spectrophotometer V-7000 (JASCO Corp.). The determination was made with the angle of an evaluation sample being 0 and 50 degrees with respect to a sample surface normal. The rate of change of the transmittance between the above angles was calculated with a formula below, and evaluated according to grades described below. The grade was used as an index of the visual feature. The determination of each sample was carried out in a non-colored state.

Rate of change of transmittance (%)=(transmittance at 0 degree−transmittance at 50 degrees)/transmittance at 0 degree)×100

Grades:
A: 0 to less than 5%: a range for practical uses
B: 10% or more to less than 10%: a range insufficient for practical uses
C: 10% or more: a range where visual confirmation is difficult The above evaluation results are shown in Table 2-1.

Table 2-1 shows that the polarization control element of the present invention exhibits excellent polarization properties, stability of controlling polarization properties, and visual feature.

TABLE 2-1

| Polarization Control Element | (Coating Solution) | Presence or Absence of Orientation | Evaluation Conditions | | | | | Remarks |
|---|---|---|---|---|---|---|---|---|
| | | | 1** | 2** | 3** | 4** | 5** | |
| 11 | 11 | Presence | A | A | A | A | A | Invention |
| 12 | 12 | Presence | A | A | A | A | A | Invention |
| 13 | 13 (Electrochromic Dye) | Absence | — | — | — | — | A | Comparative Example (Example 1 in JP-A No. 2007-112957) |
| 14 | (Liquid Crystal) | Presence | A | A | A | C | C | Comparative example (Liquid Crystal and Dye) |

The "—" indicates no polarization property
**(Stability by Light)

Example 12

(Preparation of Coating Solution)
Coating Solution 21 (Example)

Five parts of the foregoing compound 1 was dissolved in 95 parts of water to obtain an aqueous solution of the coordination polymer. The obtained solution was stood for 1 day for preparing coating solution 21.

Coating solution 22 (Comparative Example)

Two parts of compound 1 obtained according to Example 1 of Japanese Patent Application Publication No.2007-112957 (Paragraph 0080) was dissolved in 1,000 parts of methanol to prepare the solution described in the same publication (Paragraph 0081). The obtained solution was kept for 1 day to prepare coating solution 22.

(Confirmation of Orientation)

Coating solution 21 was dropped onto a glass substrate and coated by a bar coater of 30 μm, produced by Imoto Machinery Co., Ltd., and naturally dried for 10 minutes to prepare a glass substrate having a layer of the dye.

The same operation was carried out using Coating Solution 22 to prepare a glass substrate having a layer of the dye.

Thus obtained glass substrate having the dye layer were subjected to measurement of polarization degree by a polarization film measuring apparatus VAP-7070D, produced by JASCO Corp., for confirming the orientation of the glass substrate having the dye layer, and the orientation degree was evaluated according to the following grade.
A: Polarization degree of less than 50
B: Polarization degree of 50 to less than 90
C: Polarization degree of 90 or more The dye layer formed by Coating Solution 21 was C and that formed by Coating Solution 22 was A.

(Preparation of Polarization Element 21)

Figure 6:
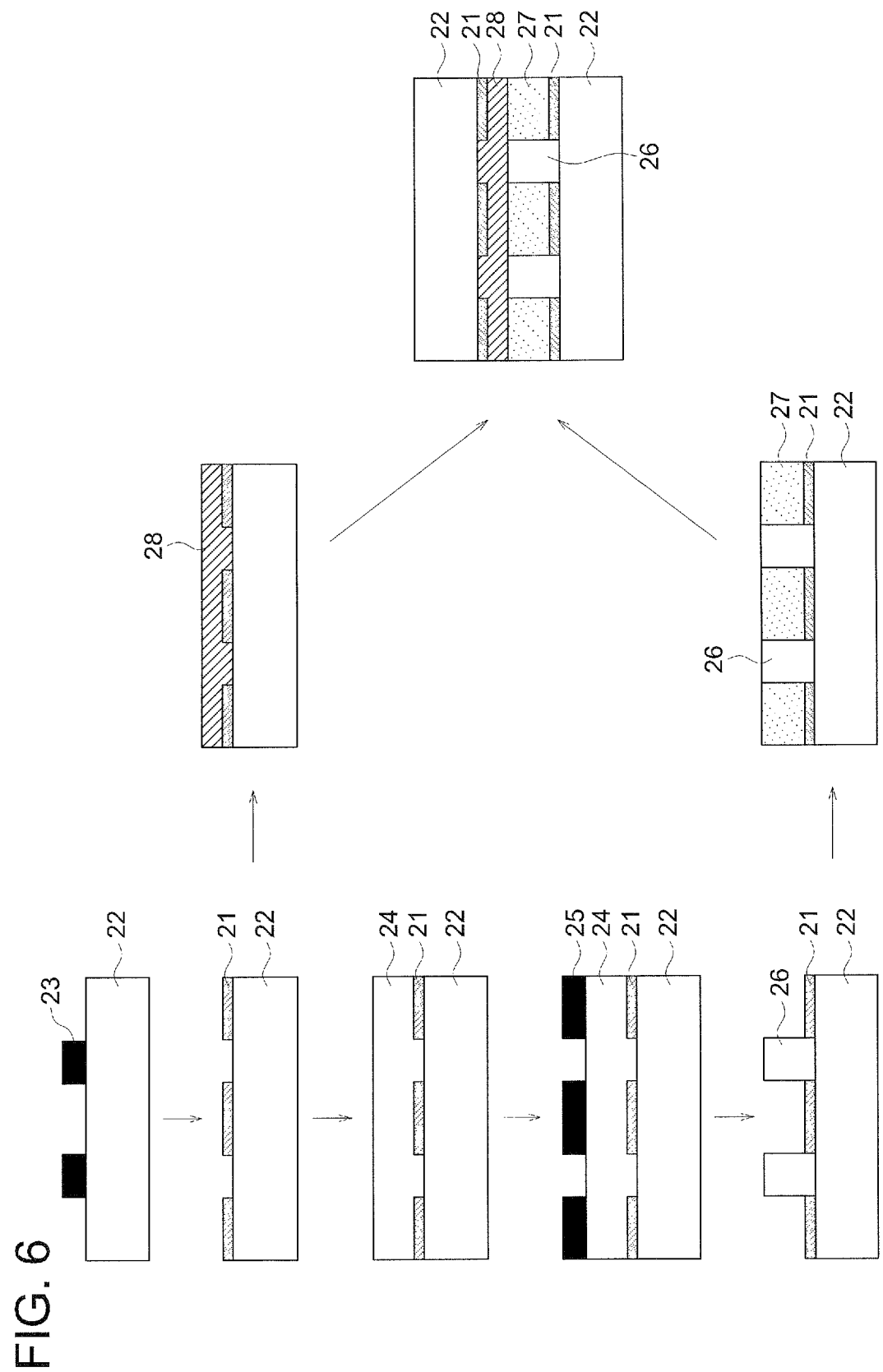
FIG. 6 is a schematic drawing of the process for preparing the polarization control element.

Scheme of the preparation process of the polarization control element is shown in FIG. 6.

An ITO electrode layer 21 having a thickness of 100 nm was formed by vapor deposition on a glass plate 22 of 30 mm square. Two glass electrodes (1-1 and 1-2) were prepared by using masks 23 on the occasion of the deposition, in each of which the shape of the electrode was a length of 30 mm and a width a of 3 mm, a distance of electrodes was 3 mm and a the distance of electrode to the edge of the glass was 1 mm.

On glass electrode 1-1, PC403 (commercial name of a product of JSR Corp.) was coated into a thickness of 10 μm and heated at 90° C. for 5 minutes to form a light sensitive isolation layer. After that, a mask was attached for forming an isolation layer on the area other than the area of the ITO electrode, and the layer of PC403 was irradiated by UV rays (High uniform type Deep UV lamp OPM-502M, produced by Ushio Inc., 365 nm, 10.5 mJ/cm$^2$, 30s), and unnecessary PC304 on the ITO electrode was removed by an aqueous solution of tetramethylammonium hydroxide, and then the glass electrode was washed by water and dried. Thus obtained glass electrode 1-1, on which the isolation layer 25 was formed, was baked for 1 hour at 220° C.

Coating solution 21 was dropped onto the glass electrode 1-2 and coated by the wire bar of 30 μm, produced by Imoto Machinery Co., Ltd., and naturally dried to form a polarization control film 28.

Glass electrodes 1-1 and 1-2 were pasted so that the shapes of the electrodes were agreed. On this occasion, the space formed by the insulating layer was filled by a 0.1 M/L acetonitrile solution of tetrabutylammonium perchlorate as the electrolyte layer 27 and sealed by the adherence so that the solution cannot be leaked out. Thus obtained was referred to as polarization control element 21.

(Preparation of Polarization Control Element 22)

An ITO electrode layer having a thickness of 100 nm was formed by vapor deposition on a glass plate of 30 mm square. The electrode was made into the same shape as electrode 21 in FIGS. 8.1 to 8.7 by using a mask on the occasion of the deposition to prepared glass electrode 2. In the glass electrode, the size of the ITO electrode was 4 mm×4 mm, the distance between electrodes was 1.5 mm and the distance between the glass edge and the electrode was 2 mm. The electrodes arranged in the direction B were shifted as shown in FIGS. 8.1 to 8.7 for simplifying the wiring. The shifting width d of the neighbor electrode was 0.01 mm and the shifting structure was linearly extended to the edge portion. The arrangement of the electrodes in the direction A was uniform and the distance to the neighbor electrode was 1.5 mm. The distance from the edge of the glass to the electrode was 2 mm.

Glass electrode 3 was prepared in the same manner as in glass electrode 2 except that the pattern of the electrode was reversed and the position of wiring was different.

On glass electrode 2, PC403 (commercial name of a product of JSR Corp.) was coated into a thickness of 10 μm and heated at 90° C. for 5 minutes to form a light sensitive isolation layer. After that, a mask was attached for forming an isolation layer at the area other than the area of the ITO electrode, and the layer of PC403 was irradiated by UV rays (High uniform type Deep UV lamp OPM-502M, produced by Ushio Inc., 365 nm, 10.5 mJ/cm$^2$, 30s), and unnecessary PC304 on the ITO electrode was removed by an aqueous solution of tetramethylammonium hydroxide, and then the glass electrode was washed by water and dried. Thus obtained glass electrode 2, on which the isolation layer 25 was formed, was baked for 1 hour at 220° C.

Coating solution 21 was dropped on glass electrode 3 and coated by the wire bar of 30 μm, produced by Imoto Machinery Co., Ltd., and naturally dried.

A 0.1 m/L acetonitrile solution of tetrabutylammonium perchlorate was filled on the electrode surrounded by the insulating layer of glass electrode 3, and then glass electrodes 2 and 3 were pasted with together so that the shape of the electrodes were agreed to prepare polarization control element 22.

(Preparation of Polarization Control Element 23)

An ITO electrode layer having a thickness of 100 nm was formed by vapor deposition on a glass plate of 30 mm square. The ITO electrode was formed into the circular shape as shown in FIGS. 9.1 to 9.3 by using a mask on the occasion of the deposition to prepare glass electrode 4. The ITO electrode was formed into a circular shape with a diameter of 5 mm and the wiring having a width of 0.01 mm was linearly formed until the edge of the glass.

Glass electrode 5 was prepared in the same manner as in glass electrode 4 except that the arrangement of the electrode was reversed and the position of the wiring was different.

On glass electrode 4 PC403 (commercial name of a product of JSR Corp.) was coated into a thickness of 10 μm and heated at 90° C. for 5 minutes to form a light sensitive isolation layer. After that, a mask was set for forming an insulation layer with a width of 1 mm around the circular ITO electrode, and the layer of PC403 was irradiated by UV rays (High uniform type Deep UV lamp OPM-502M, produced by Ushio Inc., 365 nm, 10.5 mJ/cm$^2$, 30s), and unnecessary PC304 on the ITO electrode was removed by an aqueous solution of tetramethylammonium hydroxide, and then the glass electrode was washed with water and dried. Glass electrode 5, on which an insulation layer 36 was formed, was baked at 220° C. for 1 hour.

Coating solution 21 was dropped on Glass Electrode 4 and coated by the applicator of 30 μm produced by Imoto Machinery Co., Ltd., and dried naturally.

The space of the electrode surrounded by the insulation layer 36 on the glass electrode 5 was filled by the 0.1 M/L acetonitrile solution of tetrabutylammonium perchlorate, and glass electrode 4 was pasted with glass electrode 5 so to agree the shapes of the electrodes to prepare Polarization Element 23.

Polarization control elements 21, 22 and 23 were each displays uniform polarization property on overall surface under the condition without application of any voltage.

In Polarization Control Element 21, when voltage is applied to a desired strip electrodes, the polarization property was removed at the stripe electrode portions in the shape as shown in FIGS. 7.2 to 7.3. The surface displays uniform polarization property on the overall surface by stopping the application of voltage.

In polarization control element 22, the polarization property can be removed in desired position and shape such as stripe or polygon shown in FIG. 8.5, 8.6 or 8.7 by applying voltage to desired electrodes, and the polarization property was displayed on overall surface by stopping the application of voltage. In the drawing, the portion with hatching shows the colored area having the polarization property, and the portion without hatching shows the area having no polarization property where the color disappears. It is understood by above-mentioned that further high resolution image can be displayed utilizing a TFT substrate.

In polarization control element 23, the presence of the polarization property can be switched in the circular shaped area by on/off of the application of voltage as shown in FIGS. 9.2 and 9.3.

(Preparation of Polarization Control Element 24 (Comparative Example))

Polarization Control Element 24 was prepared in the same manner as in polarization control element 21 except that the coating solution 21 was replaced by coating solution 22.

(Preparation of Polarization Control Element 25 (Comparative Example))

Al-1254, produced by JSR Corp., was laminated by spin coating on the electrode surface of glass electrodes 1-1 and 1-2 each having the ITO electrode pattern the same as those used in Polarization 21, and baked at 250° C. and then subjected to a rubbing treatment. On this occasion, rubbing treatment was carried out so that the rubbing directions on the glass electrode are the same when the electrode surface of glass electrodes 1-1 and 1-2 are arranged to be faced to the interior side. Thus glass electrodes 6 and 7 were prepared.

An insulation layer of PC403, commercial name of a product of JSR Corp., with a thickness of 5 μm was coated on Glass Electrode 6 and baked at 90° C. for 5 minutes. After that, a mask was attached for forming an isolation layer on the area other than the area of the ITO electrode, and the layer of PC403 was irradiated by UV rays (High uniform type Deep UV lamp OPM-502M, produced by Ushio Inc., 365 nm, 10.5 mJ/cm$^2$, 30s), and unnecessary PC304 on the ITO electrode was removed by an aqueous solution of tetramethylammonium hydroxide, and then the glass electrode was washed by water and dried. Glass electrode 6, on which the isolation layer was formed, was bake at 220° C. for 1 hour.

Glass electrodes 6 and 7 were pasted with together so that the electrode surfaces were faced with together, and then a liquid crystal material composed of 4'-heptyloxy-4-biphenylcarbonitrile, produced by Aldrich Corp., containing 1% by weight of methyl red, produced by Aldrich Corp., was injected into the space between the glass electrodes and sealed. The liquid crystal cell was heated by a temperature at which the cell showed isotropic property and then gradually cooled by 25° C. at a rate of 1° C/min to prepare polarization control element 25.

(Evaluation of Stability and Visual property of Polarization Control Element)

The stability and the visual features of polarization control elements 21 through 15 were evaluated. The stability of the polarization property control was evaluated by measuring the variation ratio of the polarization degree under the following conditions 1 to 3. The visual property was evaluated by the following 4.

Evaluated items were as follows:
1: Stability when the element was irradiated by visual light (25,000 Lux)

2: Stability when the element was by clear sky sun light
3: Stability when the element was heated at 50° C. for 60 minutes
4: Visual property evaluation (measurement of variation ratio of transmittance)
(Measuring Apparatus used for Evaluation)

A high brightness viewer PHC, produced by Pony Industry Co., Ltd., was used as the source of visual light. The sample to be evaluated was arranged so as to make a space between the sample and the viewer for averting the direct influence of heat from the viewer and adjusting the illuminance to 25,000 Lux. The time for irradiation to the sample was 10 minutes.

Sun light was irradiated for 10 minutes.

A hot stage of microscope FP82HT/84H, produced by Mettler Toledo Inc., was used for the heat treatment.

The polarization degree of the samples was measured after the treatment of 1, 2 or 3 within 30 seconds by a polarization film measuring apparatus VAP-7070D, produced by JASCO Corp.

(Evaluation of Stability of Polarization Property Control)

The variation ratio was determined from the difference between the polarization degree before the treatment of the evaluation item and that after the treatment by the following expression.

Variation ratio of polarization degree=(Polarization degree before treatment−Polarization degree after treatment)×100/Polarization degree before treatment Thus obtained variation ratio of polarization degree was evaluated according to the following grades as the indicator of the stability of the polarization property control.

A: Zero to 10%; practically acceptable range
B: Not less than 10% and less than 50%; practically insufficient range
C: Fifty percent or more; extremely instable range (Evaluation of Visual Property)

The transmittance was measured by the spectral photometer V-7000, produced by JASCO Corp. The measurement was carried out at an angle of evaluation sample of 0° and 50°, and the variation ratio of transmittance was determined according to the following expression. Thus obtained variation ratio of transmittance was evaluated according to the following grades as the indicator of the visual property. The measurement was carried out at the non-colored state as to all the samples.

Variation ratio of transmittance (%)=((Transmittance at 0°−Transmittance at)50°/Transmittance at)0°×100

Grades

A: Zero to less than 5%; practically acceptable range
B: Not less than 5% and less than 10%; insufficient range for practical use
C: 10 percent or more; difficultly visible range Results of the above evaluation are listed in Table 2-2.

TABLE 2-2

| Polarization Control Element | Coating Solution | Presence or Absence of Orientation | 1 (Stability by Light) | 2 (Stability by Light) | 3 (Variation by heat) | 4 (Visual property) | Remarks |
|---|---|---|---|---|---|---|---|
| 21 | 2-1 | Presence | A | A | A | A | Invention (Stripe-shaped electrode) |
| 22 | 2-1 | Presence | A | A | A | A | Invention (Grid-shaped electrode) |
| 23 | 2-1 | Presence | A | A | A | A | Invention (Circular-shaped electrode) |
| 24 | 2-2 (Electrochromic Dye) | Absence | — | — | — | A | Comparative Example (Example 1 in JP-A No. 2007-112957) |
| 25 | (Liquid Crystal) | Presence | A | A | C | C | Comparative example (Liquid Crystal and Dye) |

The "—" indicates no polarization property

It is understood from Table 2-2 that the polarization control elements of the present invention can be locally controlled and has good polarization properties, excellent stability of polarization control and excellent visual properties.

Example 13

(Preparation of Light Emission Elements 301 (inventive sample) and 302 to 304 (comparative sample)
<Preparation of Ellipse Polarization Plates 301 to 304>

WRZ film (λ/4 wavelength film produced by Teijin Ltd.) was pasted through a baseless tape at an angle of 45° to the polarization axis on the side of the electrode 4 of the glass substrate of polarization element 1 prepared in Example 1 to prepare ellipse polarization plate 301.

A photochromic dye of a spiropyrane type dye represented by the following Formula 1 (1,3,3-trimethyl-indolino-6'-nitrobenzopyrylospirane, T0336 produced by Tokyo Chemical Industry Co., Ltd.) and a transparent resin of poly(vinyl alcohol) (PVA) having a polymerization degree of 1,700, produced by Kraray Co., Ltd., were dissolved in DMSO solvent to prepare a mixture solution. The mixture ratio of dye:PVA was 1:99 by weight and the mixture solution was 12% by weight solution of the PVA.

The mixture solution was uniformly cast on polyethylene terephthalate film and dried under reduced pressure to prepare a layer having an average thickness of 70 μm.

Thus obtained film was set on a stretching machine and mono-axially stretched by 5 times in the length direction under an atmosphere of 60° C. to obtain a stretched film.

(This film was the same as the polarization element described in Japanese Patent Application Publication No. 2008-122485)

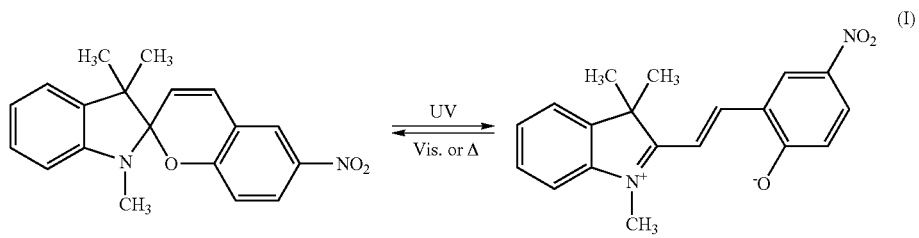

On the obtained stretched film, WRZ film (λ/4 film produced by Teijin Ltd.) was pasted through the baseless tape at an angle of 45° to the polarization axis to obtain Ellipse polarization plate 302.

After that, a solution containing a dichroic dye (commercial name: LC Polarizer TCF produced by Optiva Inc.) was coated on a bi-axially stretched PET film into a uniform layer of 1 μm and naturally dried to prepare a polarization element composed of the coating layer. (This polarization element was the same as the polarization element described in Japanese Patent Application Publication No. 2007-25465.) Then thus obtained polarization element was laminated through the baseless tape with the above WRZ film so that the absorption axis of the polarization element and the slow axis of the retardation plate made an angle of 45° to prepare ellipse polarization plate 303.

On polarization control element 4 of Example 1, WRZ film (λ/4 film produced by Teijin Ltd.) was pasted through the baseless tape at an angle of 45° to the polarization axis to obtain ellipse polarization plate 304.

(Preparation of Light Emission Element)

Each of the above Ellipse Polarization Plates 301 to 304 was pasted through the baseless tape with the following light emission member so that the WRZ film surface of the ellipse polarization plate was face to the glass surface of the viewing side of the light emission member to obtain light emission elements (displaying elements 301 to 304).

(Light Emission Member)

The light emission members were prepared in the same method as that described in Japanese Patent Application Publication No. 2006-140444. The method was as followings.

On a glass substrate, on which an anode of ITO with a thickness of 110 nm was formed, a laminated layer structure was formed by a vapor deposition method in a layer formation chamber with a vacuum degree of $5.0 \times 10^{-4}$ Pa.

In this occasion, firstly a copper phthalocyanine (CuPc) layer of 30 nm was formed as the positive hole injection layer on the ITO, and then a layer of 50 nm of α-NPD was formed as the positive hole transfer layer on the positive hole injection layer.

After that, a mask for selectively vapor deposition was attached on the positive transfer layer to open an area for forming a R light emission layer, and Alq$_3$ (host material) and a pyrene type dopant of DCJTB were co-deposited from different vapor sources to form the R light emission layer having a thickness of 40 nm. On this occasion, the concentration of DCJTB (dopant) was 6.0%.

An area for forming a G light emission layer was opened by using a selectively vapor depositing mask, and Alq$_a$ (host material) and coumalin 6 (dopant) were co-deposited from different vapor sources to form the G light emission layer having a thickness of 40 nm.

At this time, the concentration of coumalin 6 (dopant) was 0.2%.

Moreover, an area for forming a B light emission layer was opened by using a selectively vapor depositing mask, and BH-140 (host material) and BD-052 (dopant) were co-deposited from different vapor sources to form the B light emission layer having a thickness of 30 nm. On this occasion, the concentration of BD-52 (dopant) was 5.0%. BH-140 and BD-052 are each the product name of an organic EL blue light emission layer material produced by Idemitsu Kosan Co., Ltd.

And then, a layer of Alq$_a$ of 30 nm was formed as an electron transfer layer, and a layer of lithium fluoride (LiF) of 1 nm was formed on the electron transfer layer as an electron injection layer. And finally, an aluminum layer of 200 nm was formed on the electron injection layer as a light reflective cathode. Thus, a light emission member having plural self light emission element each containing the R, G and B light emission layers.

The light emission member was provided in a stainless steel box in which calcium chloride was charged as a moisture absorber, so that the glass substrate of the light emission surface only contacted with external air for preventing the deterioration of the light emission member.

A color image was obtained by applying image data to the light emission member, the image data were adjusted for displaying desired image when the image was observed under a condition without external lighting.

(Evaluation)

(Stability of Visibility as to Variation in External Lighting Environmental)

In the state in which a color image was displayed by driving the light emission member, the visibility of the image when the sample was kept for 60 minutes under an office environment (lighted at 600 Lx by fluorescent light) and that of the sample exposed to clouded sky sun light (about 20,000 Lux) were visually confirmed. The sample on which the image was clearly visible under both conditions was ranked into grade A, that on which the image was slightly visible under either one of the conditions was ranked into grade B, and that on which the image was invisible under either one of the conditions was ranked into grade C, as an indicator of stability of the control.

The color image was displayed by applying the image data which were adjusted so that the desired image was displayed when the image was observed under the condition without external light. Such the condition was the same in the followings.

(Stability of Visibility under High Temperature Environment)

In the state in which the color image was displayed by driving the light emission member, the visibility of the image when the sample was kept under condition of 30° C. or 60° C. was visually confirmed. The sample on which the image was clearly visible under both conditions was ranked into grade A, that on which the image was slightly visible under either one of the conditions was ranked into grade B, and that on which the image was invisible under either one of the conditions was ranked into grade C, as an indicator of stability of the control.

(Variation ratio of Display Element Under the Condition of without Polarization Property)

In the state in which a white image was displayed by driving the light emission member, the variation of luminance before and after disappearance of the polarization property was measured by CS-2000, produced by Konica Minolta Inc., and the luminance variation ratio was determined by the following expression. The results were revaluated according to the following ranking as a indicator of the visual property.

For light emission element 302, a light source is separately necessary for appearance and disappearance of the polarization property. Therefore, a UV irradiation source and a visible light irradiation source were provided on outside of the viewing side of image displaying frame so that the ellipse polarization plate could be irradiated by the light.

Luminance Variation Ratio=(Luminance after disappearance of polarization property/Luminance before disappearance of polarization property)×100

The measurement was carried out at angles of 0° (front) and 50° (oblique) to the normal line of the image surface.
A: Not less than 130%
B: Not less than 110% and less than 130%
C: Not more than 110%

Light Emission Element 302 causes a problem in practical use since it is probable that UV rays necessary for appearing the polarization property enters into human eyes and the UV rays is danger to the human body.

(Evaluation of Color Under the Condition of without Polarization)

In the state in which a white image was displayed by driving the light emission member, the color of the image under a condition of non-polarization was visibly evaluated from the front and oblique of 50° to the normal line of the image surface according to the following ranking as an indicator of the visual property.

<<Evaluation Grade of Angle Dependency of Color>>
A: Color is not different between the front view and oblique view.
B: Difference in the coloring of the reflected external light is slightly observed between the front view and the oblique view.
C: Difference in the coloring of the reflected external light is strongly observed between the front view and the oblique view.

Light emission element 303 could not to be subjected to this evaluation since the polarization could not be varied in this element.

In the state in which any image was not displayed without driving the light emission member, the reflection of the external light was observed and the effect as a mirror was evaluated according to the following grades.
A: The face of the observer can be self-recognized.
B: The face of the observer can be slightly self-recognized.
C: The face of the observer cannot be self-recognized at all.

The results are listed in Example 2-3.

Example 2-3

It can be understood from Example 2-3 that the optical elements excellent in the stability of polarization control and the visibility and has the multifunction can be easily obtained by the use of the ellipse polarization plate using the polarization control element of the present invention.

The right-half of Light Emission Element 301 could be used as a mirror when the image was displayed on the left-half surface and no image was displayed on the right-half surface of the element. In Light Emission Elements 302 and 303, a part of the image could not be made as mirror. In light emission element 304, a part of the image displaying surface could be functioned as a mirror but both of the visibility and the mirroring ability were insufficient when the surface was observed form the oblique angle (50°).

Moreover, light emission element 301 could be used as a lighting element by emitting light on the entire surface.

Example 2-4

(Multi-layer Polarization Control Element)

Polarization control element 41 was prepared in the same manner as in polarization control element 21 except that the preparation is carried out as follows.

Electrodes were prepared in which the width of the stripe-shaped electrodes was made to the same as the pixel size of the displaying element and the space between the adjacent electrodes was made to the same as the black matrix sized between the displaying elements, and coating solution 1 was coated by the wire bar of 30 μm on the electrodes in the direction of parallel with the stripe electrodes, produced by Imoto Machinery Co., Ltd.

Polarization control element 42 was prepared in the same manner as in polarization control element 41 except that the coating solution was coated in the direction making a right angle with that of the stripe electrodes.

A multi-layer polarization control element was prepared by pasting polarization control elements 41 and 42 through the baseless tape so that the directions, of the electrodes stripe electrodes were agreed the same.

The multi-layer polarization control element and the retardation plate used in Example 13 were piled in the same manner as in Example 13 to prepare an ellipse polarization plate.

Thus obtained ellipse polarization control plate was pasted through the baseless tape with the foregoing light emission element so that the surface of the ellipse polarization control plate was face to the polarization control element 41, placed at the viewing side to prepare as displaying element.

The displaying element could display a black image surface, 3D and 2D images and was also usable as a lighting element or a mirror by separately applying voltage to polarizing control element 41 and polarization control element 42.

The invention of claimed is:

1. An anisotropic dye layer comprising a coordination polymer, wherein the coordination polymer is a linear polymer and the coordination polymer has a partial structure represented Formula 1 in a principal chain thereof,

Formula 1 wherein, === is a single bond or a double bond, $M_1$ and $M_2$ are each a metal ion which may be the same or different, $X_1$ and $X_2$ are each a nitrogen atom, an oxygen atom or a sulfur atom which may be same or different, and L is a carbon-containing group bonding $X_1$ and $X_2$.

2. The anisotropic dye layer of claim 1, wherein the coordination polymer contains a five- or six-member nitrogen-containing heterocyclic ring.

3. The anisotropic dye layer of claim 2, wherein the coordination polymer contains a metal ion and a compound represented by Formula 2,

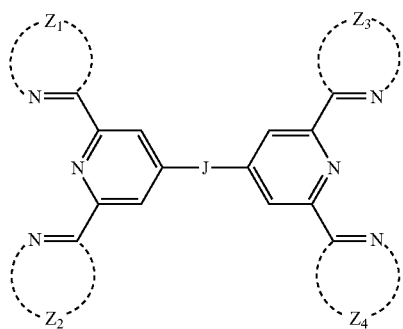

Formula 2 wherein, J is a bonding hand or a bivalent bonding group, $Z_1$ to $Z_4$ are each a group of non-metal atoms necessary for forming a five- or six-member nitrogen-containing heterocyclic ring together with C=N moiety.

4. The anisotropic dye layer of claim 1, wherein the coordination polymer contains different kinds of metal.

5. A coordination polymer for an anisotropic dye layer, comprising a partial structure represented by Formula 1 in a principal chain thereof,

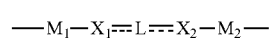

Formula 1 wherein, === is a single bond or a double bond, $M_1$ and $M_2$ are each a metal ion which may be the same or different, $X_1$ and $X_2$ are each a nitrogen atom, an oxygen atom or a sulfur atom which may be the same or different, and L is a carbon-containing group bonding, $X_1$ and $X_2$.

* * * * *